United States Patent
Maluf et al.

(10) Patent No.: US 7,596,416 B1
(45) Date of Patent: Sep. 29, 2009

(54) PROJECT MANAGEMENT TOOL

(75) Inventors: David A. Maluf, Mountain View, CA (US); Yuri O. Gawdiak, Silver Spring, MD (US); David G. Bell, Menlo Park, CA (US); Mohana M. Gurram, Sunnyvale, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 630 days.

(21) Appl. No.: 10/928,874

(22) Filed: Aug. 25, 2004

(51) Int. Cl.
*G05B 15/00* (2006.01)
(52) U.S. Cl. .......................................................... 700/1
(58) Field of Classification Search ............... 705/9–10, 705/20, 37; 700/1
See application file for complete search history.

(56) References Cited

U.S. PATENT DOCUMENTS 5,918,219 A * 6/1999 Isherwood .................... 705/37

* cited by examiner

*Primary Examiner*—Ronald D Hartman, Jr.
(74) *Attorney, Agent, or Firm*—John F Schipper; Robert M. Padilla

(57) ABSTRACT

A system for managing a project that includes multiple tasks and a plurality of workers. Input information includes characterizations based upon a human model, a team model and a product model. Periodic reports, such as a monthly report, a task plan report, a budget report and a risk management report, are generated and made available for display or further analysis. An extensible database allows searching for information based upon context and upon content.

4 Claims, 31 Drawing Sheets

View Aggregated Monthly Reports
-Reviewers can view all monthly reports on one page.

Jan Feb Mar Apr May Jun Jul Aug Sep Oct Nov Dec

2003 2004 2005 2006     Month: June     Year : 2004   View F

Monthly Report Check List
-Reviewers can view which months the reports have been submitted All Monthly Reports
-View / Submit your monthly reports.

| Monthly | Reports | Task Name | Cent | POC |
|---|---|---|---|---|
| [1] | 303.xls | Engineering for Complex Systems | ARC | Luis Medero |
| [2] | 303-10-10.xls | System Reasoning and Risk Management | JPL | Steve Prushi |
| [3] | 303-10-01.xls | Systems Engineering Support | ARC | Alan Wong |
| [3] | 303-10-20.xls | Risk Toll Suite | JPL | Chet Borden |
| [4] | 303-10-21.xls | Risk Workstation | JPL | Steve Cornfo |
| [4] | 303-10-22.xls | Mishap and Anomaly Information Systems | ARC | Irem Tumer |
| [3] | 303-10-30.xls | Core Risk Research | ARC | Irem Tumer |
| [4] | 303-10-31.xls | Model-Based Hazard Analysis | ARC | Irem Tumer |
| [4] | 303-10-32.xls | System Complexity Research | ARC | Kagan Tume |
| [4] | 303-10-33.xls | Risk Characterization and Visualization | JPL | Martin Feath |
| [4] | 303-10-34.xls | Risk-Based Design and Optimization | JPL | Chuck Weist |
| [4] | 303-10-35.xls | Mishap and Anomaly Data Mining Research | ARC | Irem Tumer |
| [3] | 303-10-40.xls | Investigation Methods and Tools | ARC | James Willia |

*FIG. 5A*

| | | | | |
|---|---|---|---|---|
| [2] 303-20-10.xls | Knowledge Engineering for Safety and Success | ARC | David Maluf |
| [3] 303-20-01.xls | CIO | ARC | David Maluf |
| [3] 303-20-50.xls | Human and Organizational Risk Mgmt. | ARC | Judith Orasa |
| [4] 303-20-51.xls | Organizational Risk Perception and Mgmt. | JPL | Judith Orasa |
| [4] 303-20-52.xls | Operations Information Analysis | JSC | Judith Orasa |
| [4] 303-20-53.xls | Human and Organizational Risk Aspects of Distributed Collaborative Design | JPL | Rebecca Wh |
| [3] 303-20-60.xls | Engineering Information Management | ARC | David Maluf |
| [4] 303-20-61.xls | Digital Shuttle | ARC | Paul Keller |
| [4] 303-20-62.xls | Virtual Iron Bird | ARC | David Maluf |
| [4] 303-20-63.xls | Wire Integrity Research | ARC | Jim Cockrell |
| [4] 303-10-64.xls | Sim Station | ARC | Mark Shirley |
| [2] 303-30-10.xls | Resilient Systems and Operations | ARC | Joan Pallix |
| [3] 303-30-01.xls | ECS L1 Activities | HQ | Yuri Gawdial |
| [3] 303-30-70.xls | Intelligent and Adaptive Operations and Control | ARC | Greg Dorais |
| [4] 303-30-71.xls | Applied Autonomous Aerospace Vehicle Technologies | ARC | Greg Dorais |
| [4] 303-30-72.xls | Autonomous Propulsion System Technology | GRC | Sanjay Garg |
| [4] 303-30-73.xls | Adaptive Flight Control Research | DFRC | Jerry Henry |
| [4] 303-30-74.xls | Human-Machine Interfaces | ARC | Rob McCann |
| [3] 303-30-80.xls | Resilient Software Engineering | ARC | John Penix |
| [4] 303-30-81.xls | High Dependability Computing | ARC | Mike Lowry |
| [4] 303-30-82.xls | Intelligent Software Engineering Tool Suite | ARC | John Penix |
| [4] 303-30-83.xls | Intelligent Software Engineering Tool Suite - Risk Workstation | ARC | John Penix |

*FIG. 5B*

Aggregated Monthly Reports

Report for the month of : 04/2004

| UPN/Title | Show Summary | Technical | Schedule | Budget | Management |
|---|---|---|---|---|---|
| 303-10-10/SRRM | Show/Hide | G | G | Y | G |
| 303-10-20/RTS | Show/Hide | G | G | G | G |
| 303-10-21/RW | Show/Hide | G | G | G | G |
| 303-10-22/MAIS | Show/Hide | G | G | G | G |
| 303-10-30/CRR | Show/Hide | G | G | Y | G |
| 303-10-31/MBHA | Show/Hide | G | G | G | G |
| 303-10-32/SCR | Show/Hide | G | G | G | G |
| 303-10-33/RCV | Show/Hide | G | G | G | G |
| 303-10-34/REDO | Show/Hide | G | G | G | G |
| 303-10-35/DAMA | Show/Hide | G | G | G | G |
| 303-10-40/IMT | Show/Hide | G | G | G | G |

TECHNICAL/MANAGEMENT COMMENT
40/30 - The outreach group has finished digitizing the videos from the workshop is working on the website, with completion expected week of 10-May
5/6 - An initial draft of the VIB book proposal has been completed and will be distributed for comment week of 10-May Schedule Comment
Behind in Schedule for conops, is to deliver a protoype VIB handbook in FY04. Slippage is 2 Months.

Budget Comment

Aggregated Monthly Reports

Report for the month of : 04/2004

| UPN/Title | Show Summary | Technical | Schedule | Budget | Management |
|---|---|---|---|---|---|
| 303-10-10/SRRM | Show/Hide | G | G | Y | G |
| 303-10-20/RTS | Show/Hide | G | G | G | G |
| 303-10-21/RW | Show/Hide | G | G | G | G |
| 303-10-22/MAIS | Show/Hide | G | G | G | G |
| 303-10-30/CRR | Show/Hide | G | G | Y | G |
| 303-10-31/MBHA | Show/Hide | G | G | G | G |
| 303-10-32/SCR | Show/Hide | G | G | G | G |
| 303-10-33/RCV | Show/Hide | G | G | G | G |
| 303-10-34/REDO | Show/Hide | G | G | G | G |
| 303-10-35/DAMA | Show/Hide | G | G | G | G |

*Fig. 8*

| USER FORM1 | | | | ☒ |
|---|---|---|---|---|
| PRODUCT | | | | ASSOCIATED RISK |

PRODUCT: ECS, SRRM, RTSAD, RW, MAIS, IMT

☐ Proposed  ☐ Approved & Retired
☒ Retired   ☒ Approved

[ Select ]

ASSOCIATED RISK: RTSAD 17 1QFY04, RTSAD 18 1QFY04, RTSAD 1 2QFY04, RTSAD 2 2QFY04, RTSAD 3 2QFY04, RTSAD 4 2QFY04

Risk Details

| | | |
|---|---|---|
| Risk ID: | RTSAD 2 2QFY04 | Milestone Element: ECS-5 |
| Has The Risk Materialized: | no | Milestone Status: |
| Can We Retire: | no | Milestone Class: Data/Methods |
| L2: | | Erasmus ID: |
| L3: | | |
| Subproduct: | | |

Unmitigated Risk

Risk Statement:
Inadequate input for risk identification and characterization (breadth, depth, quality)

Risk Effect:
More dependence on expert opinions

| Likelihood It will Occur: | Low |
| Program Level Impacted: | Med |
| Impact Timing: | Apparent in FY04 |
| Exposoure: | IV |

Mitigation Plan & Implementation Status

Strategy:
Align with Code Q P/FR and anomaly analysis effort. Establish a joint ECS/Code Q P/FR/ anomaly data analysis Integrate available anomaly/historical information. Integrate available anomaly/historical information.
Use expert opinion, captured via smart fron Status:
Already underway

| Likelihood It will Occur: | Low |
| Program Level Impacted: | Low |
| Impact Timing: | |
| Exposoure: | V |

| Add Risk | Retire Risk | Modify Existing Risk | Show Results |
| Refresh from XDB | Save updates to XDB | Create New Version of Risk | Cancel |

*Fig. 16*

| GENERAL INFORMATION | | | | |
|---|---|---|---|---|
| Title: | Sim Station | | | |
| Revision #: | B | | | |
| Task Lead: | Mark Shirley | | | |
| Technical Lead: | David Throop | | | |
| Program Manager: | Mark Shirley | | | |
| Performing Organization: | ARC | IC | AEN | 3849 |
| | Center | Code/Div | Branch/Group | Number |
| Funding Organization: | IC | | | |
| NASA Enterprise: | | | | |
| Lead Institution / Center: | ARC | | | |
| Management Center #: | ARC | | | |
| Cost Center: | ARC | | | |
| OBS: | 0-3.2.6 SIMS | | | |
| WBS: | 1-1-0 | | | |
| Fiscal Year: | 2005 | | | |

NASA RELEVANCE

Revelance to Enterprise: Low     Enterprises: U

Focus: Med     Enterprises: Y

*Fig. 17A*

General Project / Task Information

Brief Description of Project / Task :

SimStation will demonstrate the concept of a Knowledge-Integrating Virtual Vehicle a tight integration of Knowledge from many sources to help engineers and managers better understand and manage the ISS an aerospace system near the limit of what can currently be designed and build. There are many tools for simulating and managing Station. SimStations place will be to help system engineers operations staff and managers develop a big picture understanding of vehicle design and operations trades and then bring that understanding to decision-making in a wide range of situations. This means knowing how the behavior of the whole arises from its parts what influences dominate in particular situations and what scenarios are close to a performance or safety constraint.

SimStation will integrate 1 a first-order simulation of ISS power generation storage electrical and thermal loads built with Dymola a COTS simulation tool based on the Modelica modeling language;
2 scenario exploration and simulation-explanation facilities that go extend modelica 3 representation and visualization of the 3D Objectives (Where you plan to go) :

The heart of SimStation is a first-order multi-subsystem model of Stations structure function and behavior. Structure includes the physical parts including their 3D geometry how they are connected and their spatial relationships derived from ISS program qualified CAD models schematics functional block diagrams and related data sources. Function refers to the roles parts play and the mission requirements they support. An important part of the effort for FY04 is to demonstrate the feasibility of pulling datasets from the current ISS Vehicle Master Database VMDB integrating them and organizing them so as to support the system thinking tools in SinStation. SimStation will integrate a subset of the VMDB to form a backbone to help link the remaining datasets

*Fig. 17B*

Benefits/Impacts:

Having an virtual environment will lower the budget demand. No longer necessary to build a physical test environment.

Motivation (Reason for doing):

*FIG. 17C*

Teaming

Partners / Collaborators :

| Name | Center | Affiliation | Role | Email | Telephone |
|---|---|---|---|---|---|
| Paul Keller | ARC | ECS KEES EIM | Management | pkeller@mail.arc.nasa.gov | (408)384-4943 |
| Dan Duncavage | ARC | JSC ISSP | CS Management | daniel.p.duncavage@nasa.g | (408)313-4985 |
| Stephen Gonzales | ARC | JSC MOD | Systems Eng. | steven.a.gonzalez@nasa.gov | (408)489-4949 |
|  |  |  |  |  |  |
|  |  |  |  |  |  |
|  |  |  |  |  |  |
|  |  |  |  |  |  |

Customers :

| Name | Center | Affiliation | Role | Email | Telephone |
|---|---|---|---|---|---|
| Valin Thom | JSC | NASA JSC | VIPER Lead | vthom@nasa.gov | (831)394-4956 |
| William Spetch | JSC | NASA JSC | VIPER D Lead | wspetch@nasa.gov | (831)394-4957 |
| Stephen Gonzales | JSC | NASA JSC | MOD QUEST Lead | sgonzales@nasa.gov | (831)394-4958 |
| Michael S. Thompson | JSC | NASA JSC | SSTF Lead | mthompson@nasa.gov | (831)394-4959 |
| Stacey Hall | JSC | NASA JSC | SSTF D Lead | shall@nasa.gov | (831)394-4960 |
|  |  |  |  |  |  |
|  |  |  |  |  |  |
|  |  |  |  |  |  |
|  |  |  |  |  |  |

Human Resources

*Resources

| Name | Center | Organization | Role | Email | % Time |
|---|---|---|---|---|---|
| Mark Shirley | ARC | NASA | Management | jidk@nasa.gov | 100.0% |
| Richard Papsin | ARC | NASA | Lead | rpapasin@nasa.gov | 100.0% |
| Tom Cochrane | ARC | Raytheon | Lead | tcochrane@nasa.gov | 100.0% |
| Charles Neveu | ARC | QSS | Programmer | cneveu@nasa.gov | 100.0% |
| Charles Lee | ARC | QSS | Programmer | clee@nasa.gov | 50.0% |
| Brad Betts | ARC | QSS | Programmer | bbetts@nasa.gov | 100.0% |
| Jane Malin | JSC | NASA | Marketing | jmalin@nasa.gov | 100.0% |
| David Throop | JSC | Boeing | Programmer | dthroop@nasa.gov | 75.0% |
| Jennifer Lewis | JSC | J and P Tech | Quality Assurance | jlewis@nasa.gov | 100.0% |
| David Sumpter | JSC | J and P Tech | Quality Assurance | dsumpter@nasa.gov | 100.0% |
| Jonathan Cruz | LaRC | NASA | Marketing | jcruz@nasa.gov | 80.0% |
| Scott Angster | LaRC | AMA | Graphics Design | sangser@nasa.gov | 100.0% |
| Code IC Management | LaRC | AMA | Graphics Design | cmanagement@nasa.gov | 70.0% |
|  |  |  |  |  |  |

Fig. 18

| METRICS |
|---|

Current Technology Readiness Level : 2
TRL Advancement (at End of Task) : 1
TRL Advancement Date (at End of Task) : End of FY05
Comments and/or Justifications on TRL : _____
Fiscal Year when TRL 6 is Completed : 6

Minimum Exit Criteria:

The outcome by which you would measure the success of the work if all aspects of the desired outcome are not met.

> RS Develop and demonstrate an integrated cross-subsystem quick look model of ISS system behavior for what if analysis.
> Model at least attitude control and self shadowing EPS power generation and aggregate electrical loads.
> Demonstrate simulation and evaluation of function availability impacts and significant steady-state power management impacts in 10 failure Target Exit Criteria:
Target exit criteria is the desired outcome by which you would measure the success of the work proposed if all aspects of the desired outcome are met.

> RS Develop and demonstrate an integrated cross-subsystem quick look model of ISS system behavior for what-if analysis.
> Model at least attitude control and self shadowing EPS power generation thermal control and electrical loads.
> Demonstrate simulation and evaluation of function availability impacts and significant steady-state power management impacts in 10 failure

*Fig. 19*

Technologies Discipline Areas

*Information on this page is used to automatically update the NASA Technology Inventory Database (NTIDB). NTIDB provides a comprehensive accounting and description of NASA's overall technology investment, with reports based on technology discipline and application areas.*

|   |   |
|---|---|
|   | Advanced Concept Analysis |
|   | Aero & Aerothermodynamics |
|   | Autonomy |
| ✓ | Avionics |
|   |    guidance navigation and control |
|   |    attitude determination and control |
|   |    command and data handling |
|   |    telemetry tracking and control |
|   |    Entry_descent_precision landing |
|   |    satellite system architecture |
| ✓ |    hardware |
|   |    software |
|   |    electronics |
| ✓ |    flight computers and components |
|   |    microelectronics |
| ✓ |    photonics |
|   |    radiation tolerance and hardening |
|   | Biotechnology |
|   | Communications |
|   | Cryogenics |
|   | EVA |
|   | Education |
|   | In-Space Manufacturing_Processing |
|   | Information Systems |
|   | Integration and test |
|   | Instrumentation |
|   | Instruments |
|   | Life Support |
|   | Medicine/Health & Performance |
| ✓ | Power |
|   |    generation |
| ✓ |    storage |
|   |    distribution and management |
|   | Propulsion |
|   | Robotics |
|   | Space Environmental Effects |
|   | Structures/Materials |
|   | Systems Engineering |
|   | Thermal Control |
|   | Specific Technology |
|   | Thermal Protection Systems |
|   | Training Technology |

*Fig. 20A*

| Technologies Discipline Areas |
|---|
| Aeronautics technology |
| Space technology |
|   Launch Vehicles |
|   Constellations |
|   Space Transfer Vehicles |
|   Planetary Atmosphere/Surface Systems |
|   Spacecraft/Platform |
| Special Categories |

FIG. 20B

| Deliverables | | | | |
|---|---|---|---|---|

Deliverables through the end of the task life

| + | Deliverable Title | Start | Due | |
|---|---|---|---|---|
| | Sim Station Prototype | 10/2004 | 12/2004 | Add Personnel |
| Name | Mark Shirley | % involved | 10% | Remove |
| Name | Brad Betts | % involved | 50% | Remove |
| Name | Jane Malin | % involved | 50% | Remove |
| | Finalize Sim Station | 12/2004 | 03/2004 | Add Personnel |
| | Market SimStation | 03/2004 | 06/2004 | Add Personnel |
| Name | David Sumpter | % involved | 50% | Remove |
| Name | Jane Malin | % involved | 50% | Remove |
| Name | Mark Shirley | % involved | 50% | Remove |
| | | | | Add Personnel |
| | | | | Add Personnel |
| | | | | Add Personnel |
| | | | | Add Personnel |
| | | | | Add Personnel |
| | | | | Add Personnel |
| | | | | Add Personnel |

*FIG. 21*

Management Checklist (In 1K)         Estimate Uncertainty Level    100%

Quantity                   Total (K)

| Item | Quantity | Total (K) |
|---|---|---|
| Synchronization / Communications | Hours | $0.0 |
| Negotiations | Hours | $0.0 |
| Planning / Concept Development | Hours | $0.0 |
| Data Integration / Compilation | Hours | $0.0 |
| Analysis / Evaluations | Hours | $0.0 |
| Organizational / Project Design | Hours | $0.0 |
| Information Dissemination | Hours | $0.0 |
| Quality Control / Reviews | Hours | $0.0 |
| Operations Management | Hours | $0.0 |
| Estimated Total Cost | | $0.0 |

Theory/Experiments/Concepts Checklist (In 1K)    Estimate Uncertainty Level    100%

| Item | Quantity | Total (K) |
|---|---|---|
| Literature Search Space | Hours | $0.0 |
| Experiment Design Complexity | High-3,Med-2,Low1 | |
| Brainstorming | Hours | $0.0 |
| Novelty | High-3,Med-2,Low1 | |
| Design | Hours | $0.0 |
| Option Testing | Hours | $0.0 |
| Operations | Hours | $0.0 |
| Analysis | Hours | $0.0 |
| Review | Hours | $0.0 |
| Reporting | Hours | $0.0 |
| Deactivation / Disposal | Hours | $0.0 |
| Demonstrations | Hours | $0.0 |
| Estimated Total Cost | | $0.0 |

Logistics Checklist (In 1K)          Estimate Uncertainty Level    10 0%

| Item | Quantity | Total (K) |
|---|---|---|
| Supplies | Procurement Cost | $0.0 |
| Operators / Support | Hours | $0.0 |
| Site Costs | Procurement Cost | $0.0 |
| Procurements / Contracts | Hours | $0.0 |
| Estimated Total Cost | | $0.0 |

System Design Checklist (In 1K)       Estimate Uncertainty Level    100%

| Item | Quantity | Total (K) |
|---|---|---|
| Requirements | Hours | $0.0 |
| Modeling | Hours | $0.0 |
| Evaluations | Hours | $0.0 |
| Refinements | Hours | $0.0 |
| Tests | Hours | $0.0 |
| Compilation | Hours | $0.0 |
| V&V | Hours | $0.0 |
| Complexity | High-3,Med-2,Low1 | |
| Estimated Total Co st | | $0.0 |

FIG. 22A

Software Checklist (In 1K)                    Estimate Uncertainty Level   100%

|  | Quantity |  | Total (K) |
|---|---|---|---|
| Development Line Count | _____ | Hours | $0.0 |
| COTS Line Count | _____ | Hours | $0.0 |
| External Interfaces | _____ | Hours | $0.0 |
| Complexity | _____ | Hours | $0.0 |
| Novelty | _____ | High-3,Med-2,Low1 | |
| Generation Pedigree | _____ | Hours | $0.0 |
| Technology Readiness Level | _____ | 0~6 | |
| Planned Testing Levels | _____ | Hours | $0.0 |
| Certification Process | _____ | Hours | $0.0 |
| Development Techniques | _____ | Hours | $0.0 |
| Centralized vs Decentralized | _____ | Hours | $0.0 |
| Rapid Prototype | _____ | Hours | $0.0 |

| Estimated Total Cost | $0.0 |
|---|---|

Hardware Checklist (In 1K)                    Estimate Uncertainty Level   100%

|  | Quantity |  | Total (K) |
|---|---|---|---|
| Complexity | _____ | Hours | $0.0 |
| Custom Fabrication Process | _____ | Hours | $0.0 |
| Planned Testing Levels | _____ | Hours | $0.0 |
| Estimate Uncertainty Level | _____ | Hours | $0.0 |
| Fabrication | _____ | Hours | $0.0 |
| Generation Pedigree | _____ | Hours | $0.0 |
| Technology Readiness Level | _____ | Hours | $0.0 |
| Novelty | _____ | High-3,Med-2,Low1 | |
| Number of Components | _____ | Hours | $0.0 |
| Number of Interfaces | _____ | Hours | $0.0 |

| Estimated Total Cost | $0.0 |
|---|---|

FIG. 22B

PROJECT MANAGEMENT TOOL

ORIGIN OF THE INVENTION

This invention was made, in whole or in part, by one or more employees of the U.S. government. The U.S. government has the right to make, use and/or sell the invention described herein without payment of compensation therefor, including but not limited to payment of royalties.

FIELD OF THE INVENTION

This invention relates to a system for organizing, analyzing and presenting periodic status reports for management of a plurality of projects.

BACKGROUND OF THE INVENTION

A complex project having many tasks and sub-tasks, many phases and many workers will often require an evaluation of completion of the tasks and sub-tasks at several times during the project's duration. Initially and throughout the duration, suitability of the technical and inter-personal characteristics of the workers, managers and teams should also be evaluated. Suitability of the relevant skills and relevant work experience of the workers and managers for the proposed product should be evaluated initially to minimize the possibility of poor matches of these characteristics for the product to be developed. Information from a sequence of reports will be queried from time to time, by workers and managers involved in the project and by others who need the information. However, some information may be sensitive, and access to such information should be limited to specified persons.

What is needed is a system that allows a user to specify a type of report, to specify one or more classes of information within this type of report, to specify a time interval, to specify one or more projects, and to receive the status and/or comparisons of performance for the specified projects. Preferably, the system should provide a facility to fetch and incorporate information from specified external sources as well. Preferably, the system should provide for selective access to specified information, based upon user identity, user permissions and/or availability of the data sought.

SUMMARY OF THE INVENTION

These needs are met by the invention, which provides a system to receive, organize, analyze and track information and progress on a plurality of projects, and to periodically, on demand or at specified times, provide customizable status reports on selected activities performed on a selected group of these projects. This includes monthly reports, highlights of monthly reports, spreadsheet analyses, schedule management, assignment of risk categories for different activities under a project, risk management strategies, identification of financial, technical and managerial milestones associated with a project, and budget reports.

The system integrates a human model (optionally including personality assessment; worker skills, such as tools used, and processes known; worker experience and assigned tasks; and present workload), a product model (optionally including technical readiness level (TRL) range, product pedigree; technologies involved; components; interfaces; life cycle phases; and profile of present or anticipated customers), and a team model (optionally including ratios of managers-to-technical workers and introverts-to-extroverts; skill set coverage; teamwork experience; morale; team structure; team autonomy; team flexibility; and risk attitudes).

BRIEF DESCRIPTION OF DRAWINGS

FIG. 5 is a representative list of periodic (here, monthly) reports that can be regularly prepared and viewed according to an embodiment of the invention.

FIG. 8 illustrates an interactive screen for calling up status information on a specified task.

FIG. 16 illustrates an interactive screen for assessing specified risks associated with a task or project.

FIGS. 17A, 17B, 17C and 18 illustrate interactive screens for input of task plan information into the system.

FIG. 19 sets forth some metrics, or measures of performance, that can be used to evaluate the development of the project or tasks within the project.

FIGS. 20A-20B set forth some representative technology areas that might be of concern for a given project and may include an assessment of the scope and depth of human resources available to cover these technologies.

FIG. 21 sets forth deliverables associated with completion of the project or tasks within the project.

FIGS. 22A-22B illustrate management check lists for estimating time and dollars required to perform several groups of related tasks.

DESCRIPTION OF BEST MODES OF THE INVENTION

Figure 1:
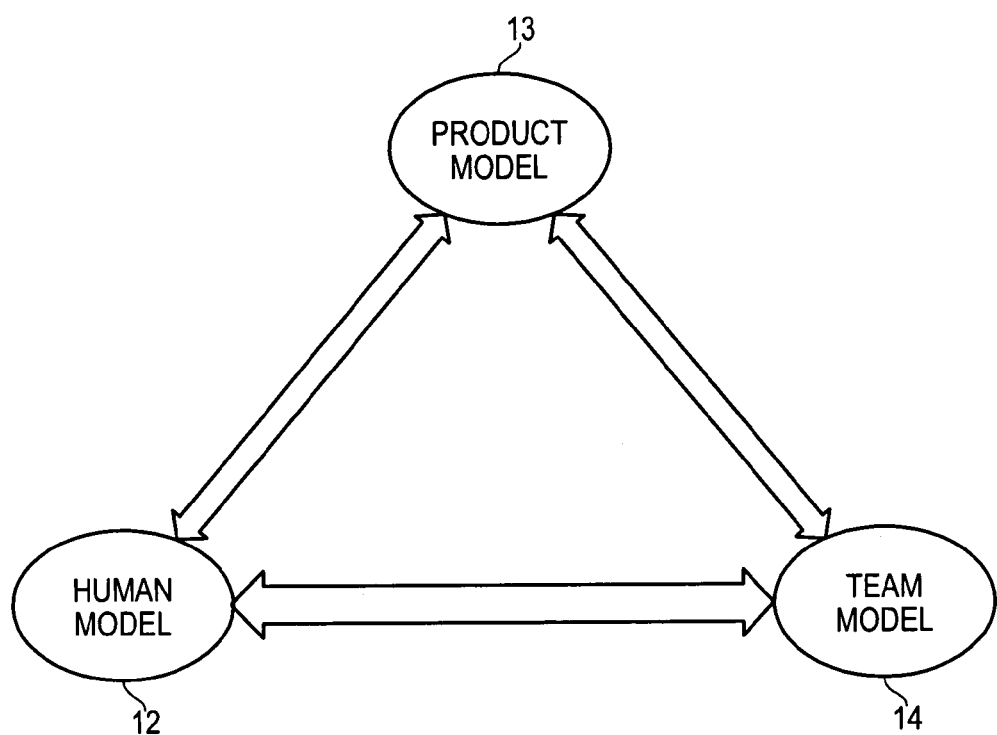
FIG. 1 schematically illustrates interaction of a human model, a product model and a team model according to the invention.

Assume that a group of M projects, numbered m=1, ..., M (M≧1) are being pursued within an organization. The status of various activities associated with each project will be reported at specified intervals, in periodic reports, referred to herein as "monthly reports" for convenience. Subsidiary reports at shorter time intervals (e.g., daily, weekly, biweekly, etc.), as well as collective reports at greater time intervals (e.g., quarterly, semi-annual, annual, bi-annual, etc.), can also be made. In order to analyze, track and obtain the desired information, the system integrates three models of contributing subsystems, as illustrates in FIG. 1: a human model 12, a product model 13 and a team model 14 for each project handled by an entity, according to an embodiment of the invention. Here "product" refers to a physical good or service or to an object of the project.

The human model 12 optionally includes, for each worker having at least some responsibility for a specified project: worker location and place within the entity; worker personality, as assessed by a personality test (e.g., Meyer-Briggs); worker morale; worker flexibility; relevant worker skills (tools and equipment used, techniques used and processes known); worker experience (roles played in past and present assignment(s), types of products worked upon, and previous tasks and performances); presently assigned tasks; and present workload.

The product model 13 optionally includes: a TRL range; a product "pedigree" (extensions of existing r&d versus totally new exploration or innovation); technologies involved, if any, in the product; components required; interfaces required; life cycle of product; maturity of product; profile of present or contemplated customers (estimated number of customers and of market, types of customers, and estimated customization or variety required).

A Technology Readiness Level (TRL) is a multi-level value assigned to a (proposed) product, based upon its present state of development. The higher the assigned value, the closer the product is to use in a real environment and for its contemplated function. In one version, a TRL includes nine levels: (1) basic principles of a product are observed and reported; (2) concept and/or application of product is formulated; (3) analytical and experimental critical function(s) and/or characteristics of product are determined to be feasible; (4) component or subsystem or system is validated by a breadboard, if appropriate, in a laboratory environment; (5) component or subsystem or system is validated by a breadboard in a relevant environment; (6) prototype of component or subsystem or system is prepared; (7) system prototype is demonstrated in a relevant environment; (8) actual system is qualified through tests and demonstrations; and (9) actual system is successfully tested many times real environment.

The team model 14 optionally includes: a ratio of managers to operational workers; a ratio of introverts to extroverts; skill set required and skill set available for project; types of operational workers required; team experience working together; estimated team morale; centralized versus decentralized structure; estimated level of autonomy; estimated flexibility of individual team members; and individual and collective attitudes toward risk.

Each of the three models provides a collective perspective on project resources and interactions between these resources. The human model 12 provides relevant perspectives on individual workers, substantially independent of presence or absence of one or more other workers. The team model 14 is closely integrated with the human model and provides assessments of interactions between an individual and other team members. The product model 13 is less closely integrated with either of the other models and indicates or assesses interpersonal skills that are required to implement or complete the project.

As a first example of use of the information in these models, a first earlier-developed product may have used a first ratio $\rho 1$ of introverts to extroverts among the workers and managers and may have required a first time interval of length T1 to initiate, develop and complete; and a second earlier-developed product (similar in scope to the first product) may have used a first ratio $\rho 2$ of introverts to extroverts among the workers and managers and may have required a second time interval of length T2 to initiate, develop and complete. If the duration T2 is substantially smaller than the duration T1, in a subsequent project to develop a similar product, the present ratio $\rho$ of introverts to extroverts for this subsequent project should, ceterus paribus, be closer to $\rho 2$ than to $\rho 1$.

As a second example of use of the information in these models, a first earlier-developed product may have used a first "mix" (M1,TW1,CA1,SA1) of M1 managers, TW1 technical workers (scientists, engineers, etc.), CA1 computer applications specialists and SA1 support and administrative workers (accountants, finance specialists, legal practitioners, etc.) (full time equivalents) and may have required a first time interval of length T1' and a cost of $C1 to initiate, develop and complete. A second earlier-developed product (similar in scope to the first product) may have used a second "mix" (M2,TW2,CA2,SA2) of M2 managers, S2 technical workers, CA2 computer applications specialists and SA2 support and administrative workers and may have required a second time interval of length T2' and a cost of $C2 to initiate, develop and complete. If T1' is substantially the same as T2' and $C1 is substantially less than $C2, in a subsequent project to develop a similar product, the "mix" for this subsequent project should, ceterus paribus, be closer to (M1, TW1, CA1, SA1) than to (M2,TW2,CA2,SA2).

Figure 2:
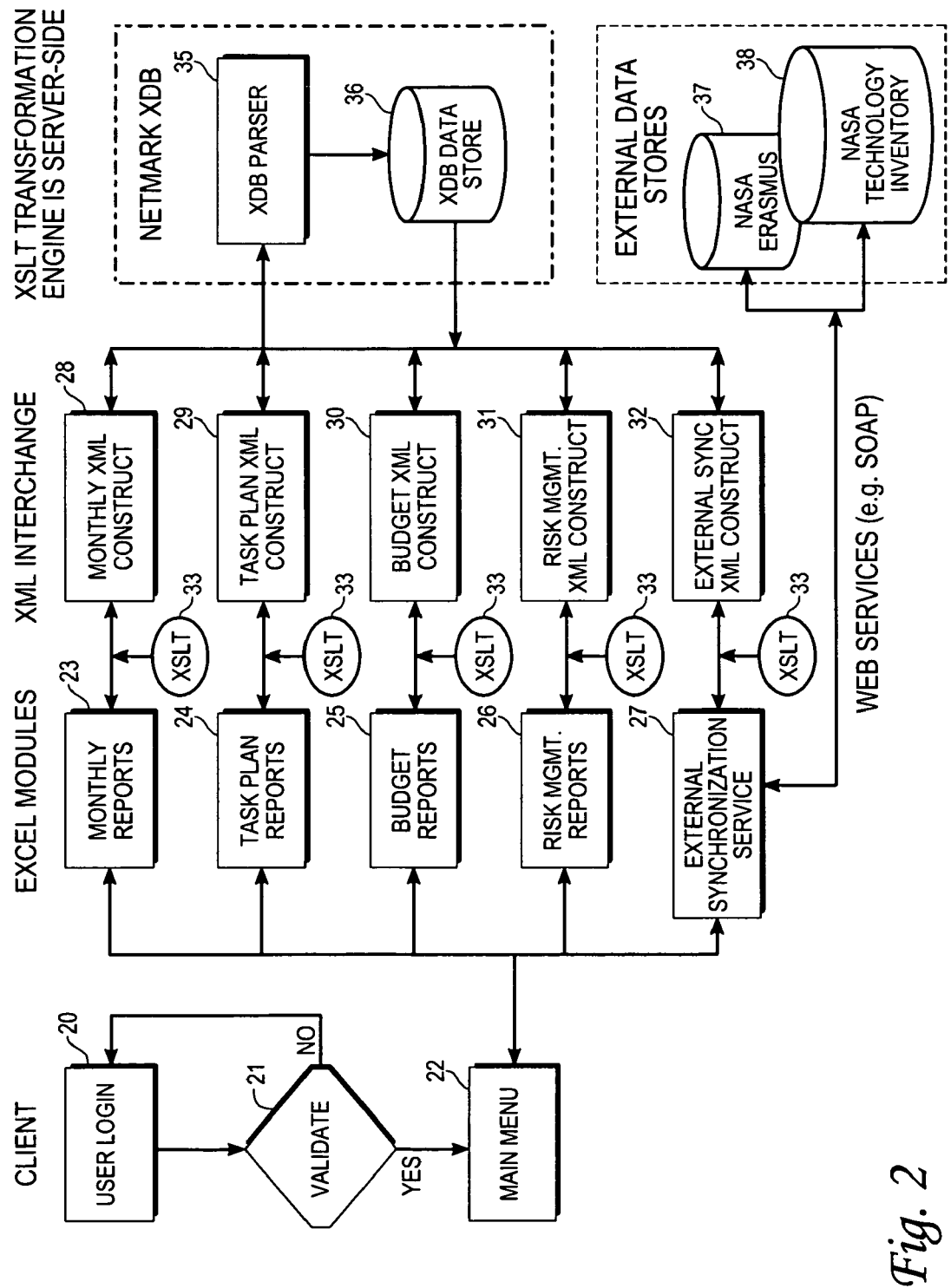
FIGS. 2 and 3 schematically illustrate suitable system architectures according to the invention.

FIG. 2 schematically illustrates a high level view of use of the invention in one embodiment. A system user or client enters a login sequence in step 20, and the system front end attempts to validate the sequence, in step 21. If the login sequence cannot be validated, the systems informs the user that validation is declined and returns to step 20. After a selected number of login failures (e.g., three) the system optionally informs the user of this failure, optionally reports this sequence of failures, and optionally deactivates this login module for a selected time interval (e.g., ten minutes, one day or one week). If the login sequence is validated, in step 21, the system provides a main menu for the user, in step 22. The user selects among as many as five types of reports, each of which behaves similarly to an Excel module: a Monthly Report (step 23), a Task Plan Report (step 24), a Budget report (step 25), a Risk Management report (step 26) and an external synchronization services report (step 27). The external synchronization services report requested in step 27 optionally uses Web services to respond to this request.

In a Monthly Report, a project manager reports the status of each of a specified set of tasks and optionally assesses the present status, versus the originally projected status, of each of these tasks at the time of reporting, optionally including the number of FTE operational workers presently working on each task. In a Task Plan Report, more detail is provided for each of the specified tasks, and a client can view and perform some analysis on these tasks.

In a Budget Report, a project manager compares a projected budget with accumulated expenditures for each of the specified tasks and optionally provides an estimate of expenditures required to complete each of these tasks. Within the Budget Report, a collection of graphical charts and accompanying tabular format presentations is available showing: full cost summary, civil servant full time equivalent (FTE; hours or other time units), civil servant labor dollars, travel costs, allocated burden or overhead (G&A), and N.A.S.A. money expended for each manager and for each operational worker.

In a Risk Management Report, a manager indicates the risk(s) that have been accepted, or are proposed to be accepted, to complete each specified task, for review and approval or disapproval of acceptance of such risk(s) and for review of suitable risk mitigation measures. Each specified task optionally has associated therewith a technical perspective (e.g., percent completed), a schedule perspective, a budget perspective and a management perspective with a color coded dialog button indicating the present degree of risk (e.g., green, yellow and red, corresponding to low, moderate and high risk, respectively) that this task will not be completed as originally projected.

Using Extensible Markup Language (XML) or another suitable language a Monthly Report is constructed (step 28), a Task Plan Report is constructed (step 29), a Budget Report (step 30), a Risk Management Report (step 31) or an external synchronization services report (step 32) is constructed, corresponding to the client selection in step 22. A software module 33, labeled XSLT (extensible stylesheet language transformation), provides a translation between the language(s) used in the report construction steps 28-32 and the user-requested format for providing the reports in steps 23-27.

Construction of the report or plan, as in step 28, 29, 30, 31 and/or 32, uses a Netmark parser 35, or an extension thereof, that provides content searching and/or context searching and is substantially disclosed in patent application U.S. Ser. No. 10/232,975, which is incorporated by reference herein. An extended Netmark parser 35 searches a data store module 36 and either identifies one or more locations within the data store module that satisfies the request, or returns the information specified in the request (steps 23, 24, 25, 26 and/or 27).

Figure 3:
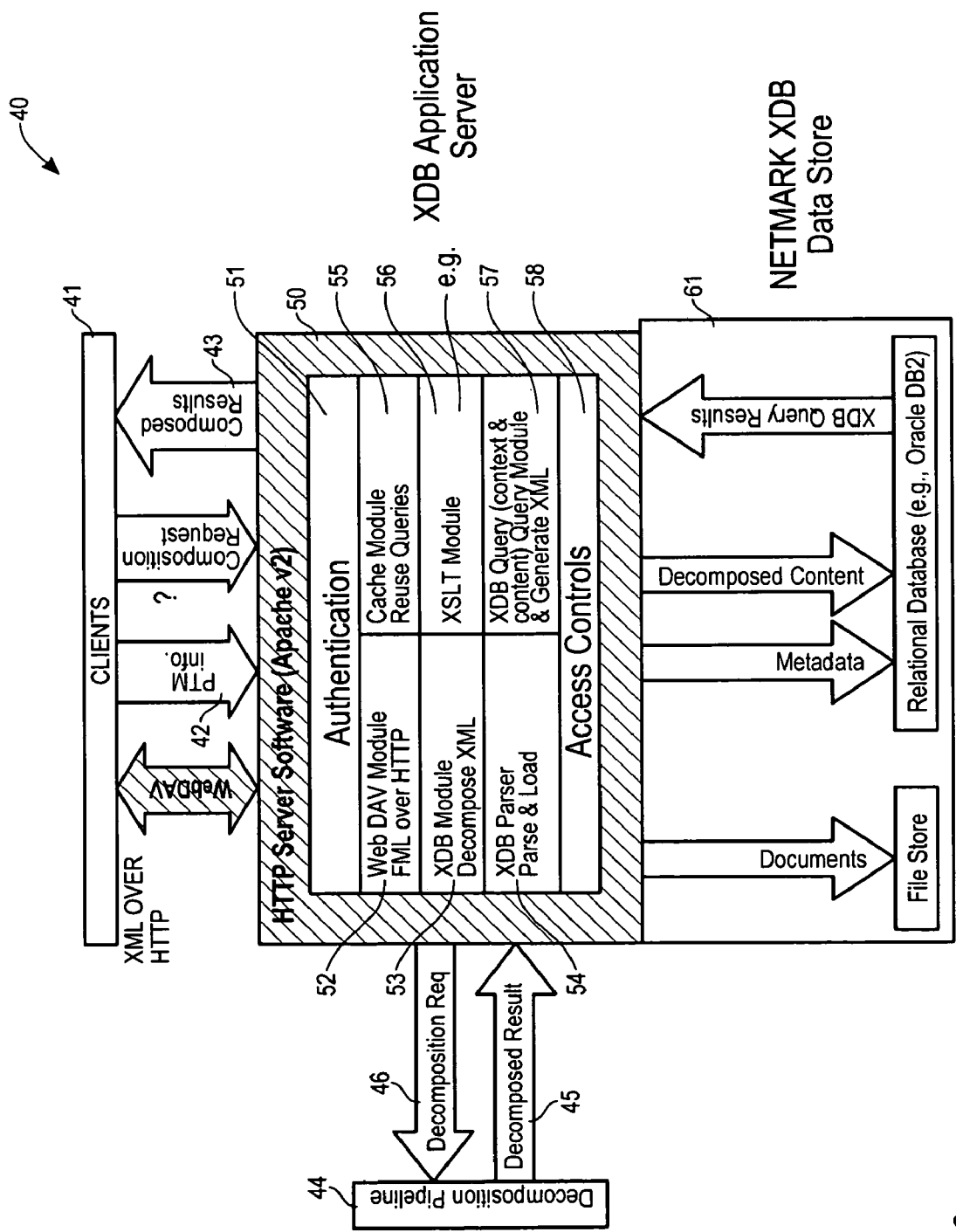

FIG. 3 provides another perspective on the architecture illustrated in FIG. 2. A client-information supplier ("client-supplier") 41 provides a PMT-formatted information statement 42 for direct use in the system 40, in a format or composition that is prescribed by the system. A client, including but not limited to a client-suppler, may request a project report or other result(s) from the system 40, by entering a PMT information request 43 in a prescribed format or composition. Optionally, a client, client-supplier or another information source 44 also provides supplemental information statements 45, not necessarily in a prescribed format or composition, that are decomposed and reformatted in a format that the system recognizes and with which the system can work. This reformatting of the supplemental information 45 may rely upon content searching and/or context searching, as described in another patent application, U.S. Ser. No. 10/232, 975.

An XDB application server 50 receives the PMT information 42 and the supplemental information 45 and directs this information to an appropriate processor(s) for further analysis and use. The XDB server 50 optionally includes an authentication module 51 that authenticates the information provider and/or the information requester, using a password, a biometric indicium, a subscriber list or another means to distinguish authenticated users from non-authenticated entities.

The XDB server 50 optionally includes a WebDAV (Web distributed authoring and versioning) module 52, an XDB module 53, an XDB parser 54, a cache module 55, an XSLT module 56, a query module 57 and an access control module 58. The WebDAV module 52 provides XML over HTTP communication between a client 41 and a system including an XDB database. The XDB module 53 decomposes a statement in XML. The XDB parser module 54 provides context searching and content searching of information, retrieved from an XDB data storage module 61 that receives and stores PMT-formatted or non-formatted information statements from an information supplier. The cache module 55 receives and temporarily stores information statements previously requested by another user and operates in a manner similar to operation of a computer cache. The system 40 is a multiple user system so that it is possible, even likely, that two or more users will request the same information in the same or a similar format. The XSLT module 56 translates information requests and information responses between a client-supplied format and a format understood and used by the system 40. For example, the XSLT module 56 translates between XML language on the server side and any of HTML, pdf, spread sheet and a Word document on the user side.

The query module 57 receives an information query in a user-supplied format and provides a restatement of the user's query in a format understood and used by the system. The access control module 58 controls access to the XDB data store module 61 by XDB server modules, such as the query module 57. This access may require provision of a password or other authentication mechanism and/or may require that the access be requested in a specified format.

The N.A.S.A. XDB-IPG (extensible database-information power grid platform) is a flexible, complete cross-platform module, a set of essential interfaces that enable a developer to construct an application and that inter-operate at the data level. The XDB-IPG provides uniform, industry standard, seamless connectivity and interoperability. The XDB-IPG allows insertion of information universally and allows retrieval of information universally. An XDB-IPG API provides a call level API for SQL-based database access.

The XDB-IPG uses existing relational database and object oriented database standards with physical addresses for efficient record retrieval. The XDB-IPG works with structured, semi-structured and unstructured documents. XDB-IPG defines and uses a schema-less, hybrid, object-relational open database framework that is highly scalable. The XDB-IPG generates arbitrary schema representations from unstructured and/or semi-structured heterogeneous data sources and provides for receiving, storing, searching and retrieval of this information.

XDB-IPG relies upon three standards from the World Wide Web Consortium Architecture Domain and the Internet Engineering Task Force: (1) hypertext transfer protocol (HTTP) for a request/response protocol standard; (2) extensible markup language (XML), which defines a syntax for exchange of logically structured information on the Web; and (3) a Web distribution and versioning (WebDAV) system that defines http extensions for distributed management of Web resources, allowing selective and overlapping access, processing and editing of documents. XDB-IPG provides several capabilities for distributed management of heterogeneous information resources, including: storing and retrieving information about resources using properties; (2) locking and unlocking resources to provide serialized access; (3) retrieving and storing information provided in heterogeneous formats; (4) copying, moving and organizing resources using hierarchy and network functions; (5) automatic decomposition of information into query-able components in an XML database; (6) content searching plus context searching within the XML database; (7) sequencing workflows for information processing; (8) seamless access to information in diverse formats and structures; and (9) provision of a common protocol and computer interface.

In the hybrid object-relational model (referred to herein as ORDBMS), all database information is stored within relations (optionally expressed as tables), but some tabular attributes may have richer data structures than other attributes. As an intermediate, hybrid cooperative model, ORDBMS combines the flexibility, scalability and security of using relational systems with extensible object-oriented features (e.g., data abstraction, encapsulation inheritance and polymorphism. Six categories of data are recognized and processed accordingly: simple data, without queries and with queries; non-distributed complex data, without and with queries; and distributed complex data, without and with queries. Simple data include self-structured information that can be searched and ordered, but do not include word processing documents and other information that are not self-structured. XDB-IPG is concerned primarily with distributed complex data that can be queried.

Preferably, XML is used to incorporate structure, where needed, within documents in XDB-IPG, as a semantic and structured markup language. A set of user-defined tags associated with the data elements describes a document's standard, structure and meaning, without further describing how the document should be formatted or describing any nesting relationships. XML serves as a meta language for handling loosely structured or semi-structured data and is more verbose than database tables or object definitions. The XML data can be transformed using simple extensible stylesheet language transformation (XSLT) specifications and can be validated against a set of grammar rules, logical Document Type definitions and/or XML schema.

Because XML is a document model, not a data model, the ability to map XML-encoded information into a true data model is needed. XDB-IPG provides for this need by employing a customizable data type definition structure, defined by dynamically parsing the hierarchical model structure of XML data, instead of any persistent schema representation. The XDB-IPG driver is less sensitive to syntax and guarantees an output (even a meaningless one) so that this driver is more effective on decomposition that are most commercial parsers.

The node type data format is based upon a simple variant of the Object Exchange Model (OEM), which is similar to the XML tags. The node data type contains a node identifier and a corresponding data type. A traditional object-relational mapping from XML to a relational database schema models the data within the XML documents, as a tree of objects that are specific to the data in the document. In this model, an element type with attributes, content or complex element types is generally modeled as object classes. An element type with parsed character data and attributes is modeled as a scalar type. This model is then mapped into the relational database, using traditional object-relational mapping techniques or as SQL object views. Classes are mapped to tables, scalar types are mapped to columns, and object-valued properties are mapped to key pairs. The object tree structure is different for each set of XML documents. However, the XDB-IPG SGML parser models the document itself, and its object tree structure is the same for all XML documents. The XDB-IPG parser is designed to be independent of any particular XML document schemas and is thus schema-less.

An XDB preferably uses a universal database record identifier (UDRI), which is a subset of the uniform resource locator (URL) and which provides an extensible mechanism for universally identifying database records. This specification of syntax and semantics is derived from concepts introduced by the World Wide Web global information initiative and is described in "Universal Recording Identifiers in WWW" (RFC1630).

Universal access (UA) provides several benefits: UA allows different types and formats of databases to be used in the same context, even when the mechanisms used to access these resources may differ; UA allows uniform semantic interpretation of common syntactic conventions across different types of record identifiers; and UA allows the identifiers to be reused in many different contexts, thus permitting new applications or protocols by leveraging on pre-existing and widely used record identifiers.

The UDRI syntax is designed with a global transcribability and adaptability to a URI standard. A UDRI is a sequence of characters or symbols from a very limited set, such as Latin alphabet letters, digits and special characters. A UDRI may be represented as a sequence of coded characters. The interpretation of a UDRI depends only upon the character set used. An absolute URI may be written
<scheme><scheme-specific-part>.

The XDB delineates the scheme to IPG, and the scheme-specific-part delineates the ORDBMS static definitions.

Each periodic (e.g., monthly) progress report, task plan report and risk management report uses a sequence of XDB queries to identify and format XML data into tabular cells within a Microsoft Excel or similar spreadsheet. A Netmark XDB query is executed within a standard HTTP request/response protocol, as a URI or URL. A result of the query is returned as well-formed XML content which can be parsed, transformed and/or processed by an application for rendering and for presentation via XSLT or by Visual Basic macros. A Netmark XDB query allows use of single or multiple context-plus-content keyword search criteria, and allows display of performance status for an ECS Engineering Information Management project. In one approach, input commands such as &CONTEXT, &CONTENT, &SYNTAX, &SCOPE, &XPATH and $XSLT are used to specify type of search, display option(s), scope of objects to be searched, and details concerning server-side processing and user-side processing.

Figure 4A:
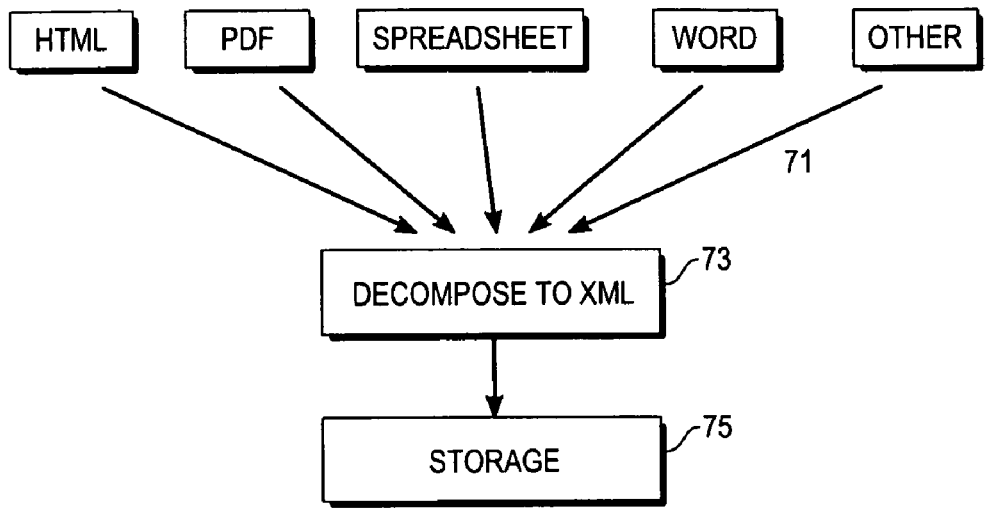
FIGS. 4A and 4B schematically illustrate flow of information into and out of the system.
Figure 4B:
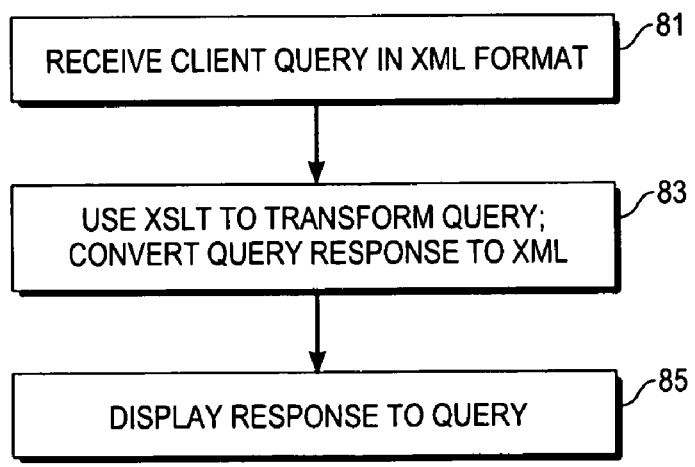

FIGS. 4A and 4B illustrate a flow of information into and out of the system according to an embodiment of the invention. In FIG. 4A, a user-supplier enters PMT-specific information in a HTML, PDF, spread sheet, Word document format, or other non-PMT-specific (supplemental) information, from a desktop in step 71. This information statement or information request is received and decomposed, for example, in an XML/HTML transformation, in step 73 and is stored in a server storage unit, in step 75, for subsequent query and/or analysis.

In FIG. 4B, the server system receives an information query in XML format from a user, in step 81. In step 83, the server system uses XSLT to transform the query request and to convert to an XML response sequence, representing a response to the query. In step 85, the converted sequence is displayed in a visually perceptible format for the user who submitted the query.

Figure 6:
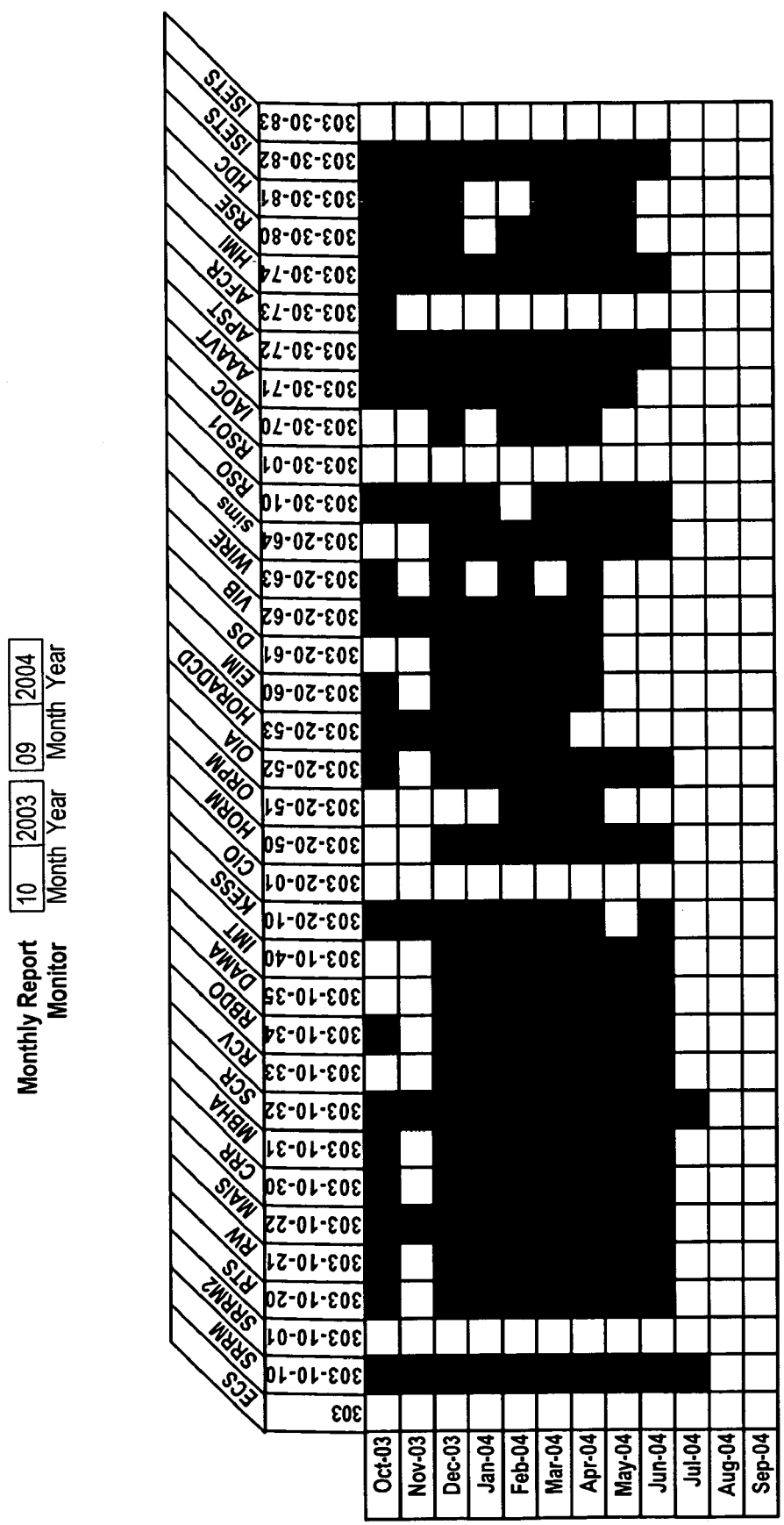
FIG. 6 indicates, in a spreadsheet format, which periodic reports have, or have not, been submitted at the present time.

FIG. 5 illustrates a screen that can be used to submit or to view periodic (e.g., monthly) reports that are regularly submitted in an embodiment of the invention, together with the name and affiliation of the person responsible for each such report. As each report is received, a "check-off" is performed for that period, and a blank space in a spreadsheet (illustrated in FIG. 6 for 3 calendar years of 12 months each) is replaced by another color or by a selected symbol. A user can quickly determine if a chosen report for a given period is available for viewing, using FIG. 6, and can return to FIG. 5 to call up an available report.

Figure 7:
FIG. 7 indicates the status of formal milestones for each of several projects in the system.
Figure 9:
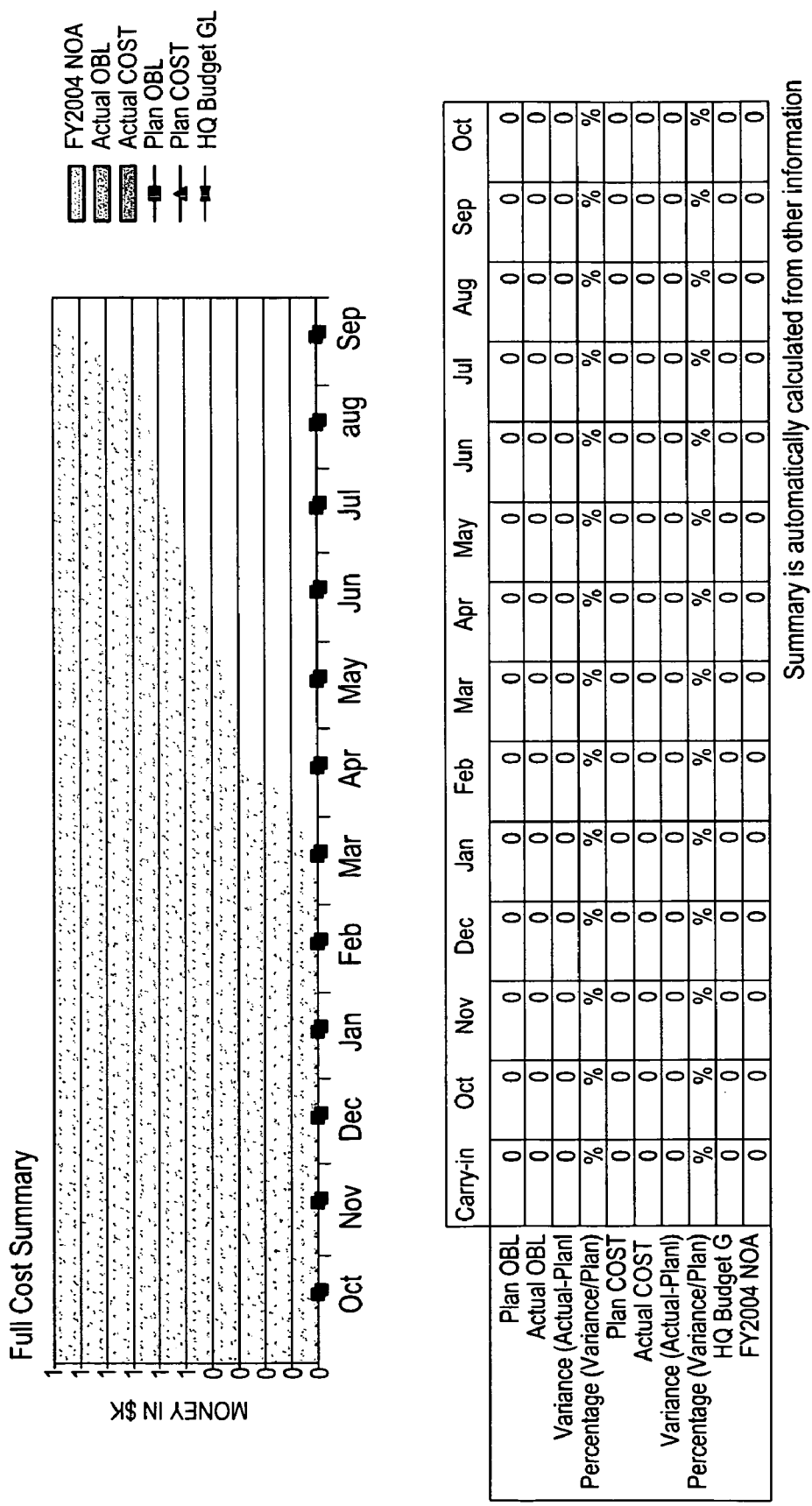
FIGS. 9-15 illustrate displays of resource allocations consumed for each period for a project.
Figure 10:
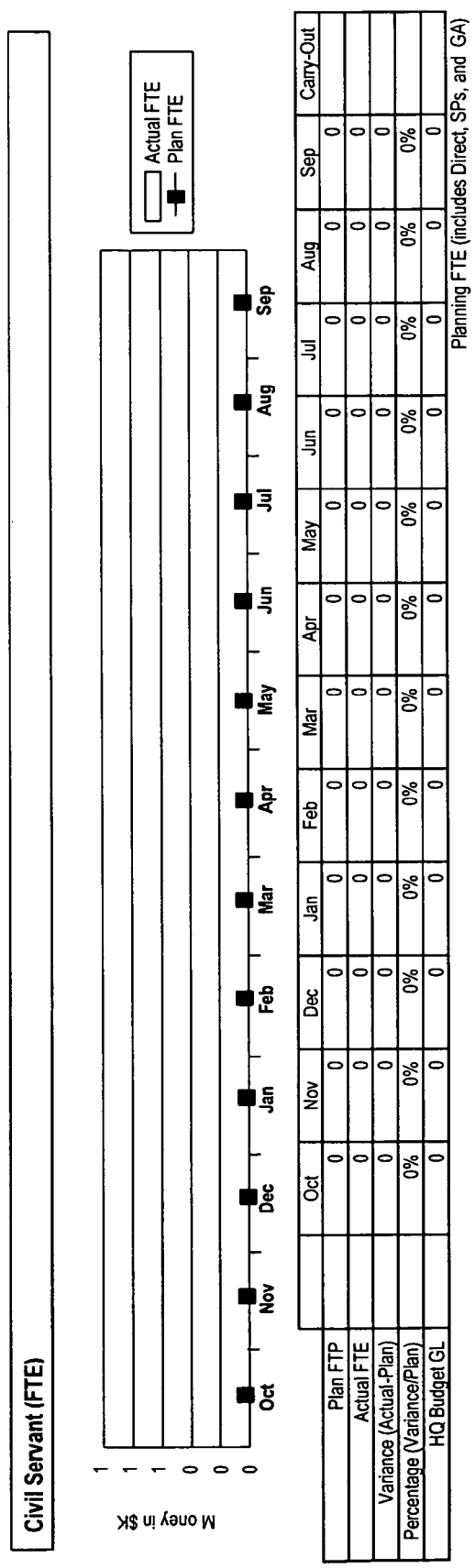
Figure 11:
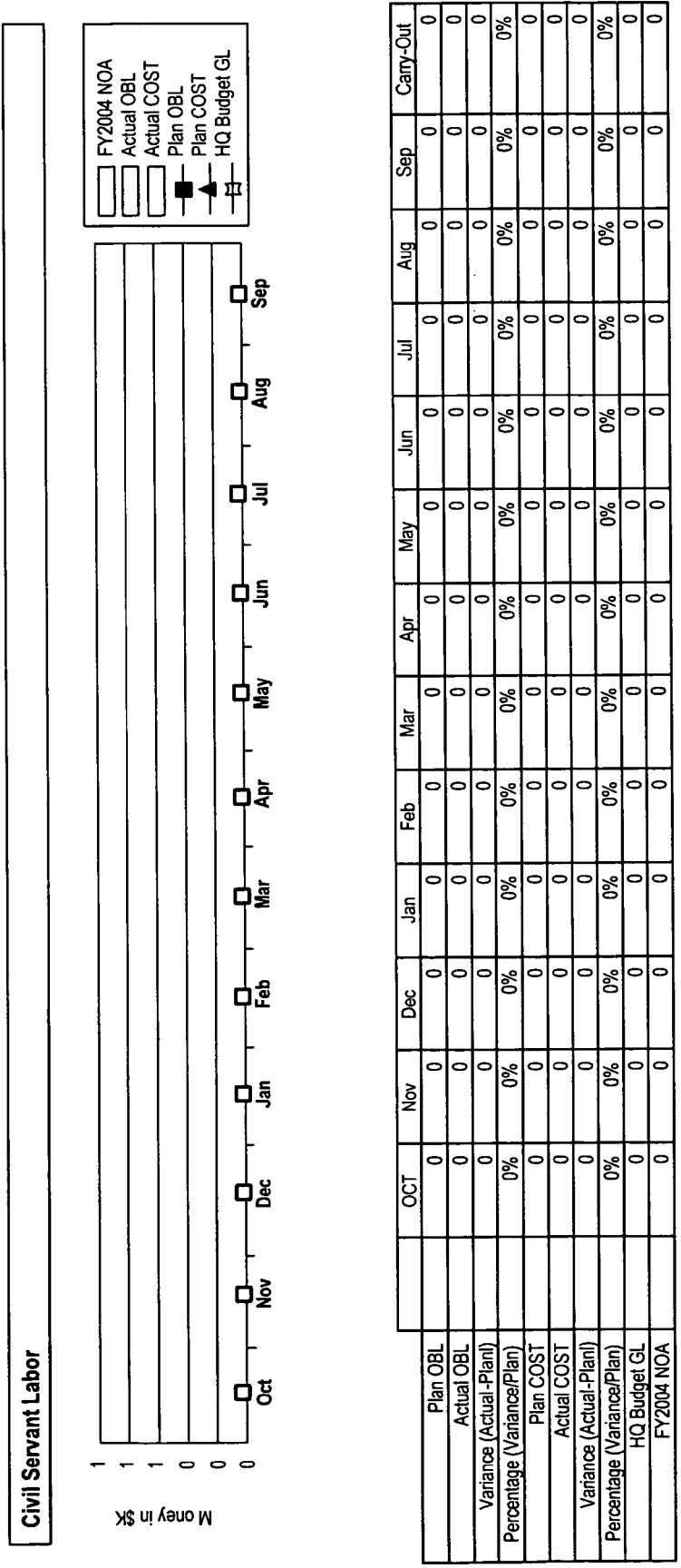
Figure 12:
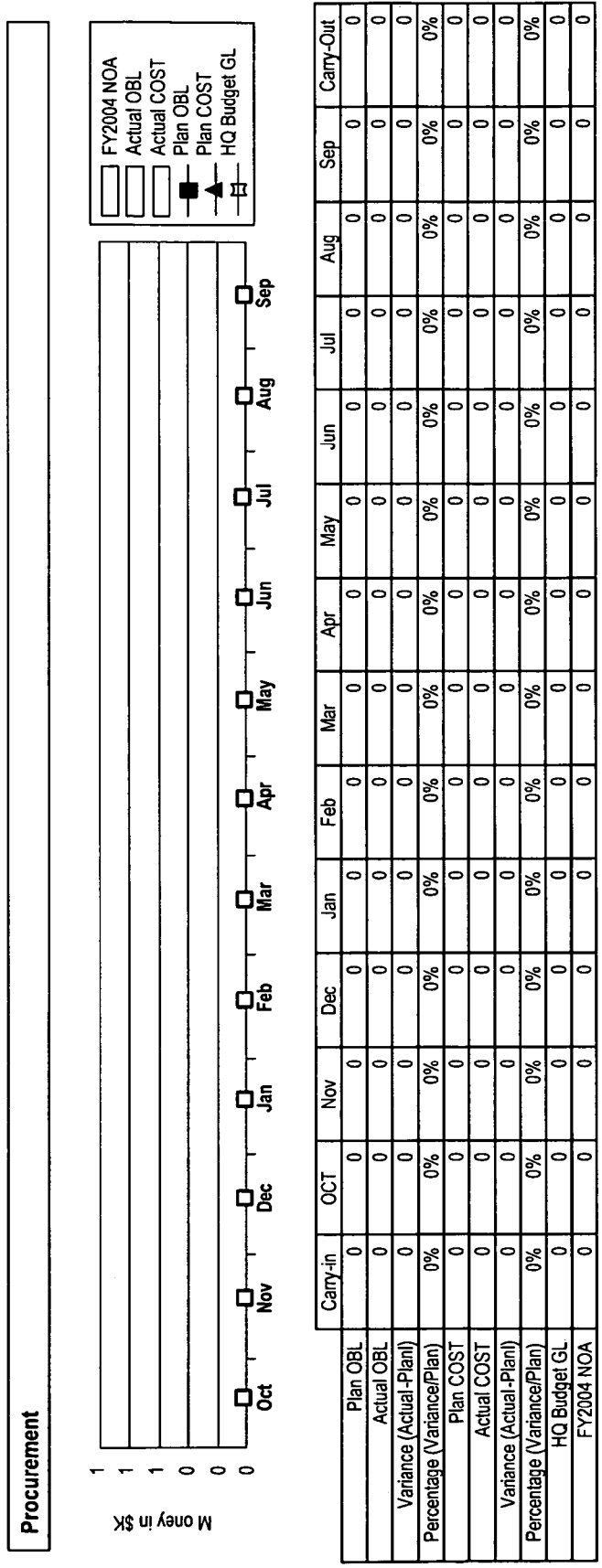
Figure 13:
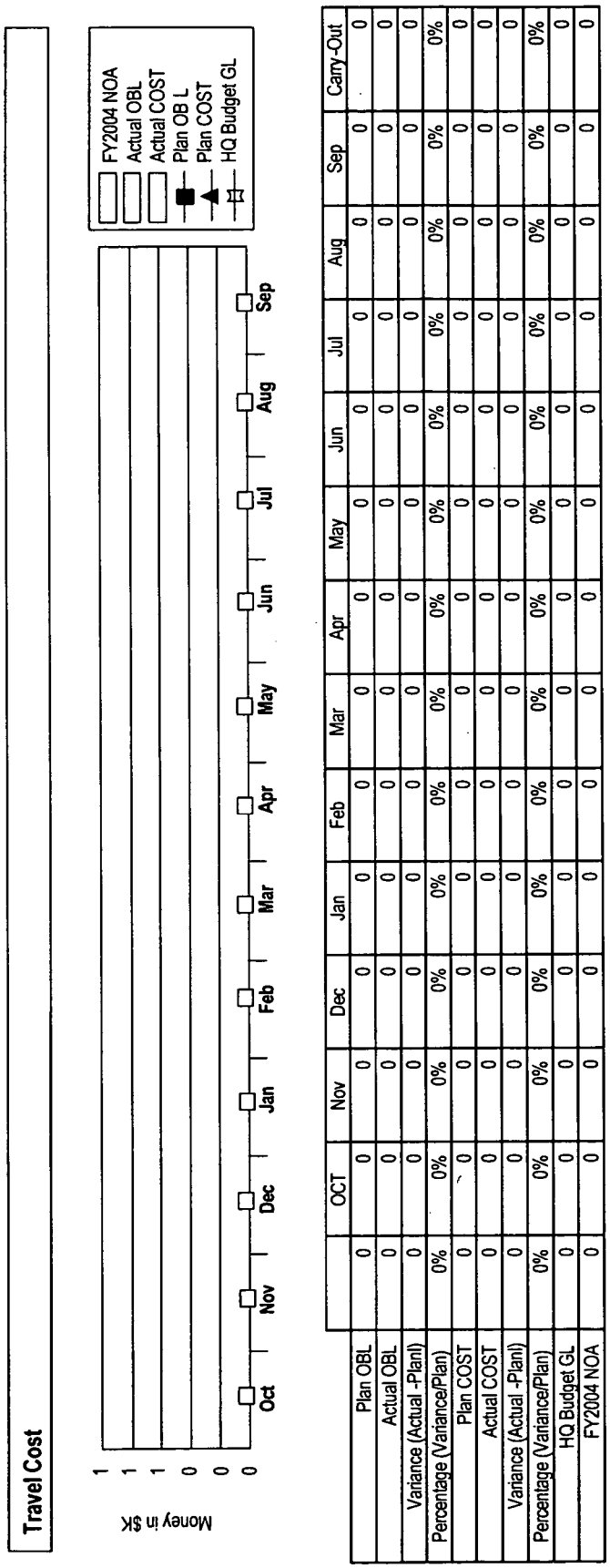
Figure 14:
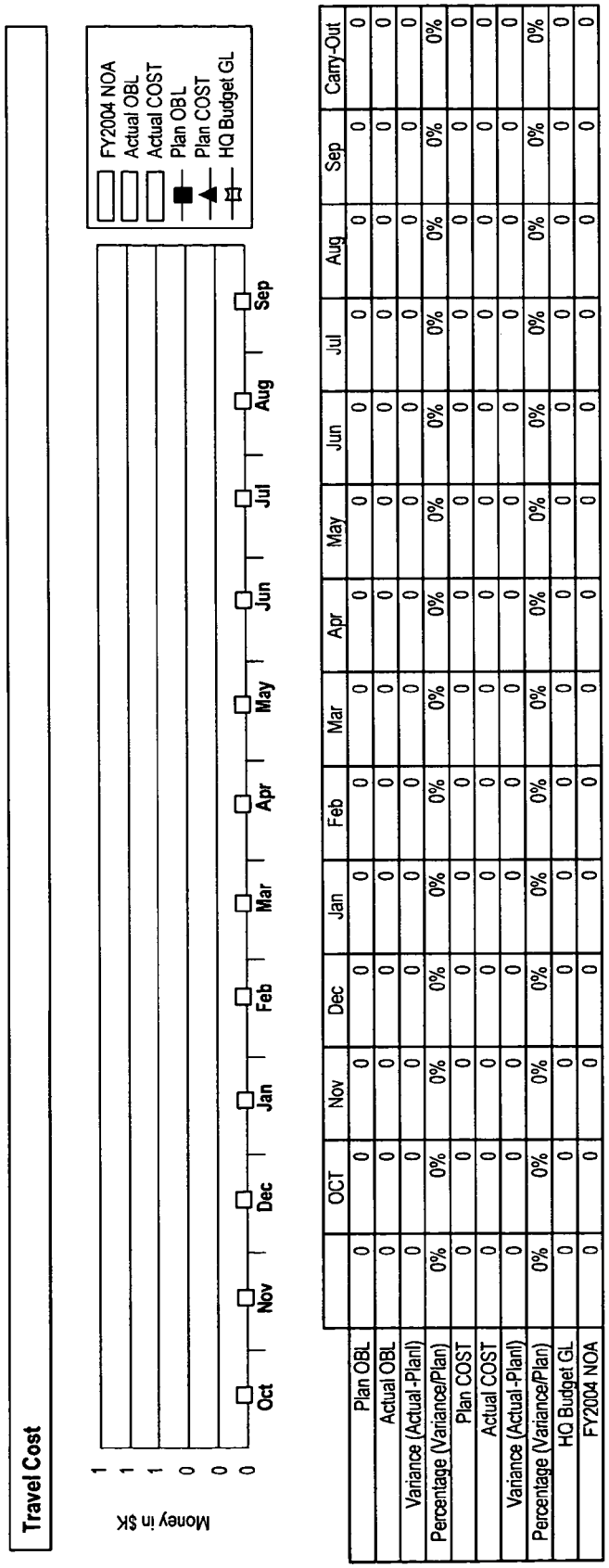
Figure 15:
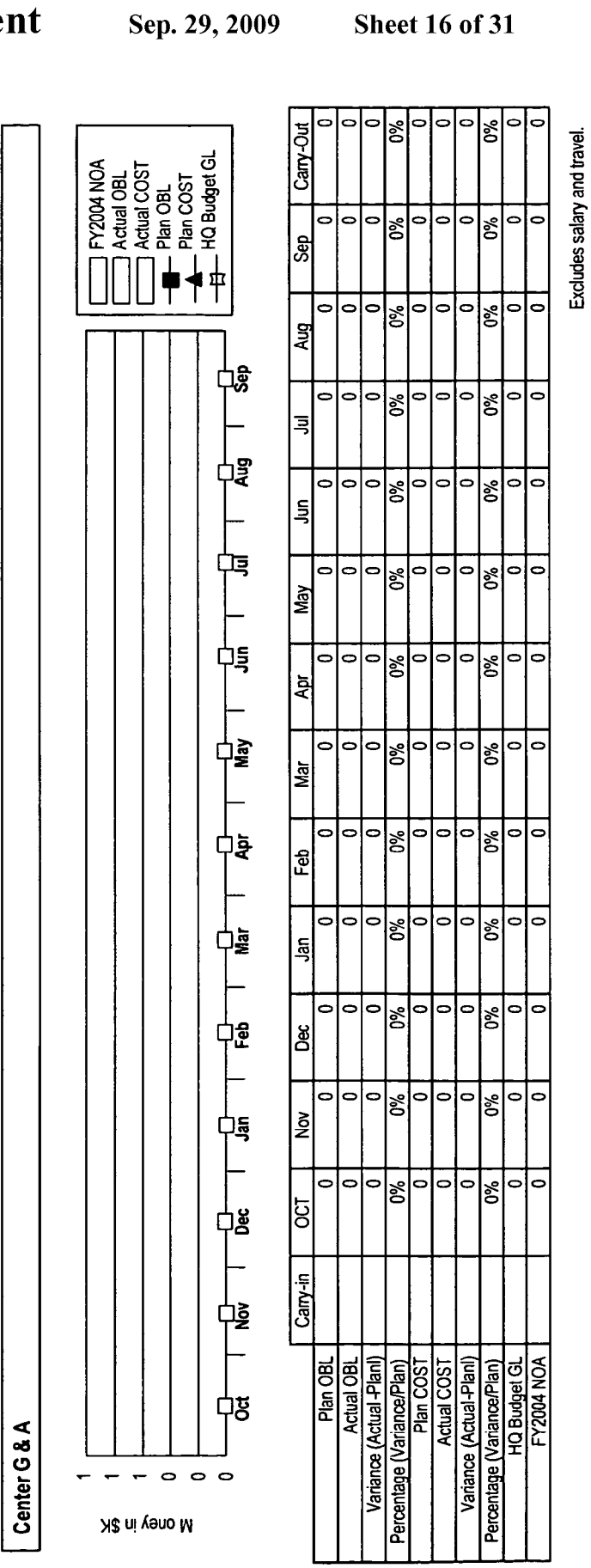

FIG. 7 illustrates a screen that displays milestones in each of four categories for eight consecutive quarters of two fiscal years and for each of eleven specified tasks: completed milestone, due but not yet completed, slipped milestone (time delay in completion), and deleted milestone. A project may have milestones associated with some tasks and not with others, as illustrated in FIG. 7. A milestone should be distinguished from a schedule for completion of one or more tasks, which is generally present for any task. Each of a group of tasks may have a risk (that a task will not be completed on time or within budget or meeting specified technical requirements) associated with each task, based on availability of technical personnel and/or equipment and/or test equipment and/or material and/or funding. In one approach, present status of a task is color coded green if the schedule is being met, yellow if the schedule has slipped or is slipping substantially, and red if the task is stalled.

FIG. 8 illustrates an interactive screen, showing a sequence of identified tasks at the left and allowing a call-up of information on technical status, schedule status, budget status and/or management status for the task, using the indicated buttons shown at the right.

FIGS. 9-15 display information, in graphic format and in tabular format, on full cost expenses, full time equivalent (FTE) civil servant allocation, civil servant labor, procurement expenses, travel cost, indirect services expenses, and general and administration (G&A) expenses for a task or a project for a specified time interval (here, 12 consecutive months). The display presents projected versus actual expenditures and deviations, projected cost versus actual cost to date and deviations, and the amount budgeted for each reporting period (here, monthly).

FIG. 16 illustrates an interactive screen for assessing specified risks associated with a task or project, optionally including determinations of: has the risk materialized; likelihood that a specified risk will occur; characterization(s) of non-mitigated risks; risk mitigation plan, if any; and relationship, if any, of a risk to a milestone.

FIGS. 17A, 17B and 17C illustrate interactive screens for input of task plan information into the system, including identification of task leaders, funding information and statements of task objective(s), benefits from completion of task, motivation for performing the task, technical and human resource and budget challenges, innovative ideas proposed to address the challenges, and present state of the technical art, if relevant. These documents may be supplemented by identification of, and personal information on, the managers and operational workers and on the (potential) customers or users of the results of the project, illustrated in an interactive screen in FIG. 18.

FIG. 19 sets forth some metrics, or measures of performance, that can be used to evaluate the development of the project or tasks within the project. This includes an assessment of the current technology readiness level (TRL), target criteria for completion of the project and exit criteria for withdrawal from the project before completion.

FIGS. 20A and 20B set forth some representative technology areas that might be of concern for a given project and may include an assessment of the scope and depth of human resources available to cover these technologies. A project total cost is distributed or allocated across features and activities associated with the project.

FIG. 21 sets forth deliverables associated with completion of the project or tasks within the project.

FIGS. 22A and 22B illustrate management check lists for estimating time and dollars required to perform several groups of related tasks.

Figure 23:
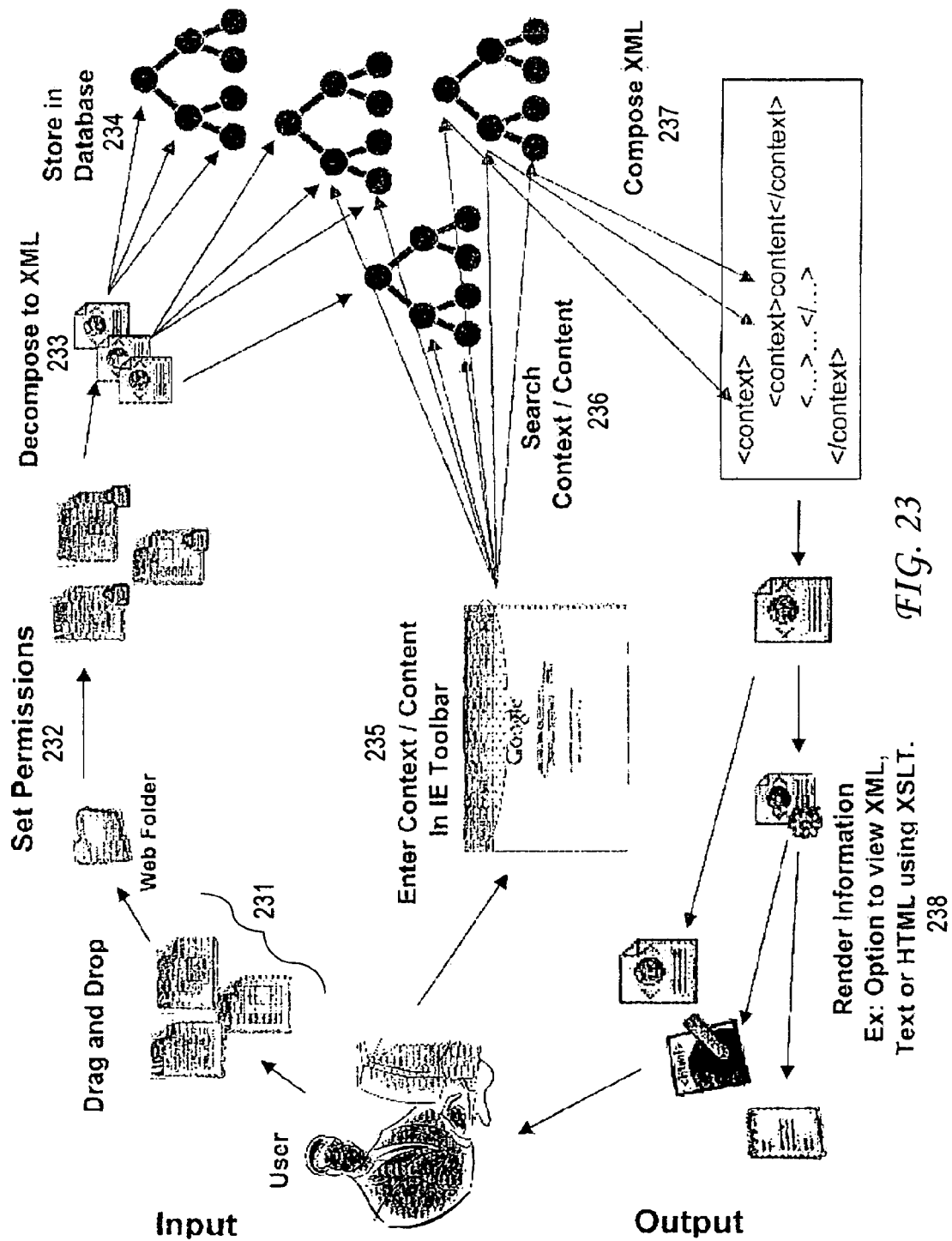
FIG. 23 schematically illustrates user input and output according to the invention.

FIG. 23 schematically illustrates user input and output according to the invention. In step 231, a user-supplier enters information, using drag and drop or another entry maneuver, into a Web folder. In step 232, read/write/edit/delete permissions and database access permissions are set by the system for this information and this user. The entered information is decomposed to XML, in step 233, and the formatted information is stored in a data base, in step 234. In step 235, a user enters an information query, using an IE toolbar, specifying context searching and/or content searching. In step 236 the system searches for, and identifies, the requested information.

In step 237, the identified information is composed as an XML file, and is rendered into a user-perceptible format in step 238. The user can select among options to view the rendered information as XML, as text or as HTML, using XSLT.

Figure 24A:
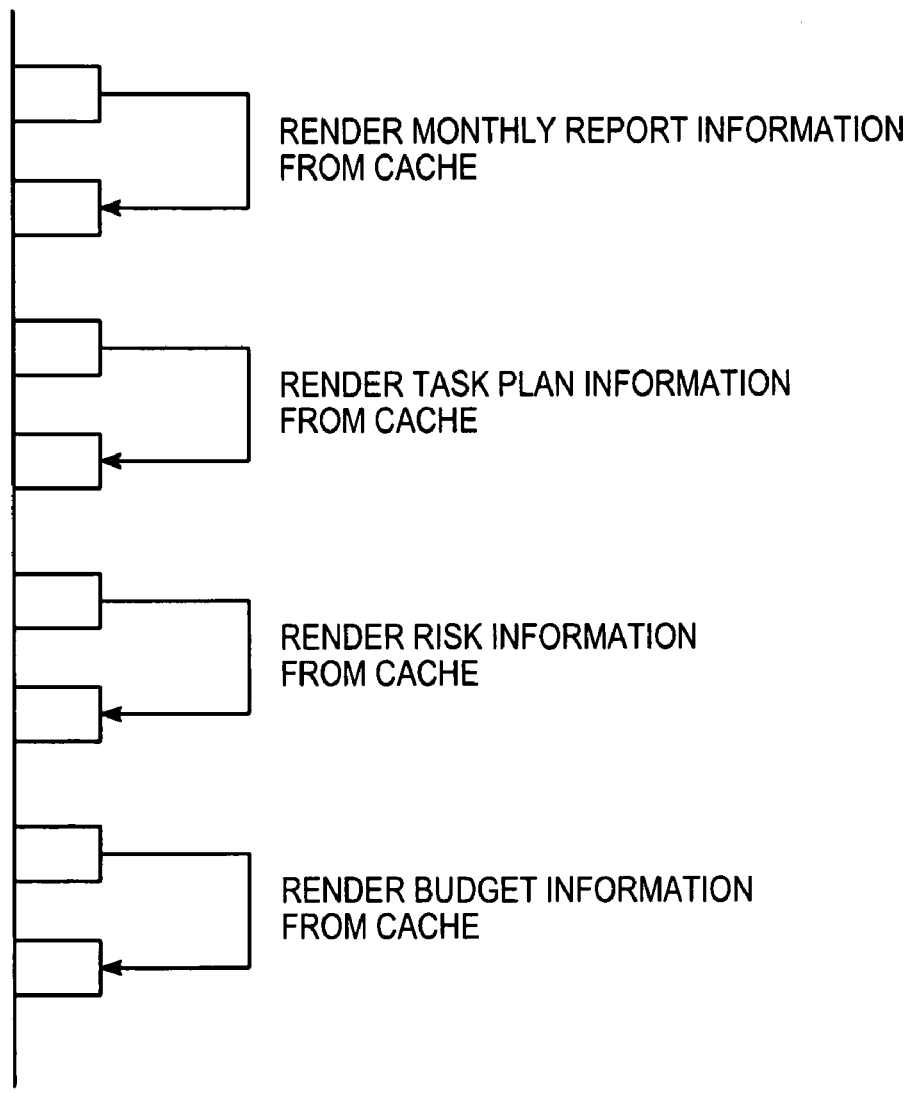
FIGS. 24A and 24B illustrate client side rendering of information, as requested by a user.
Figure 24B:
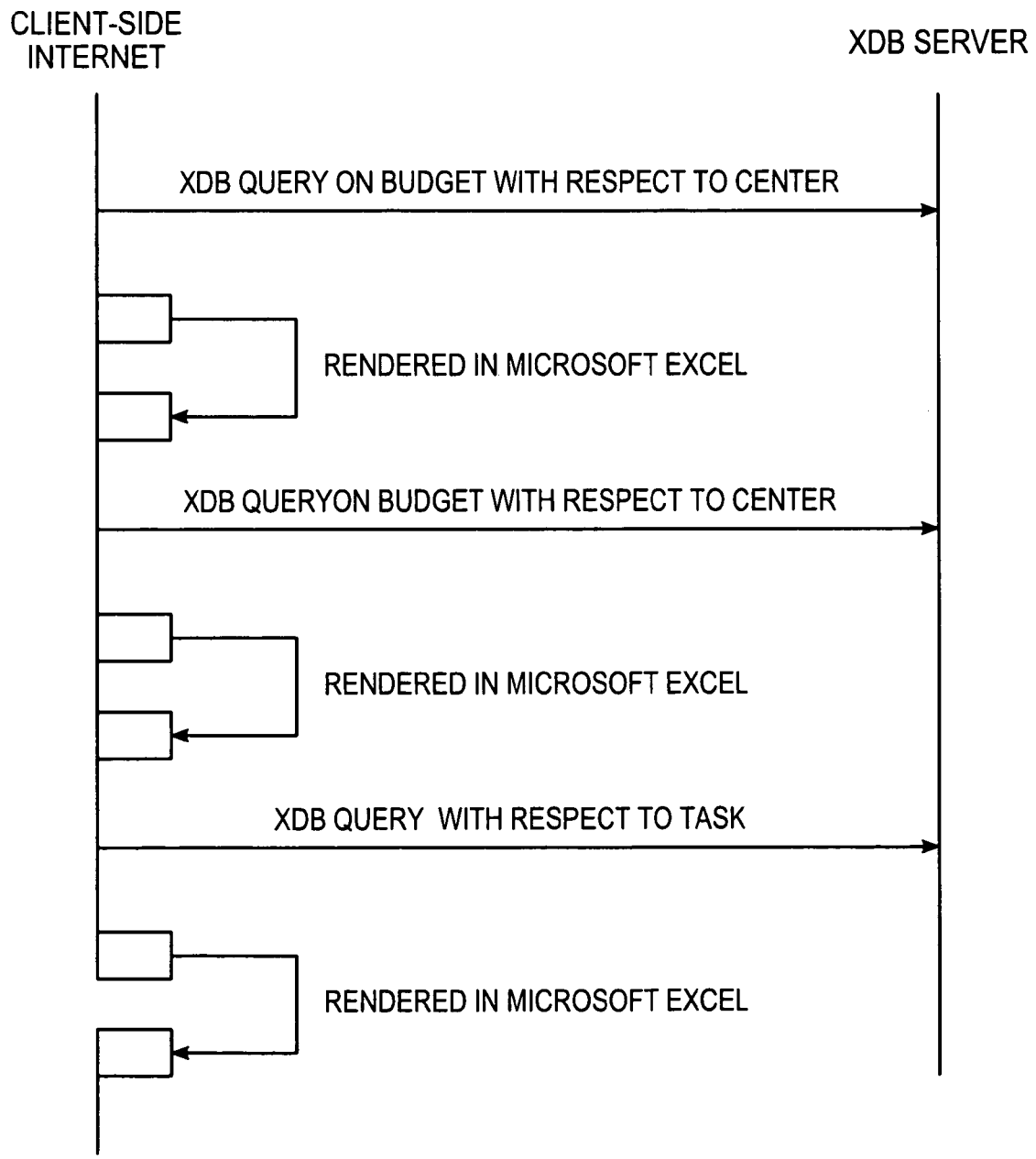

FIG. 24A is a high level view illustrating user side rendering of information, as requested by a user. Information from any of a Monthly Report, from a Task Plan, from a Risk Assessment, and from a Budget Presentation is identified and pulled together from a cache or other information source. FIG. 24B is a high level view illustrating entry of an XDB query for a Budget item, for a Monthly Report item and for a Task Plan item, according to a query format chosen by the user.

Figure 25:
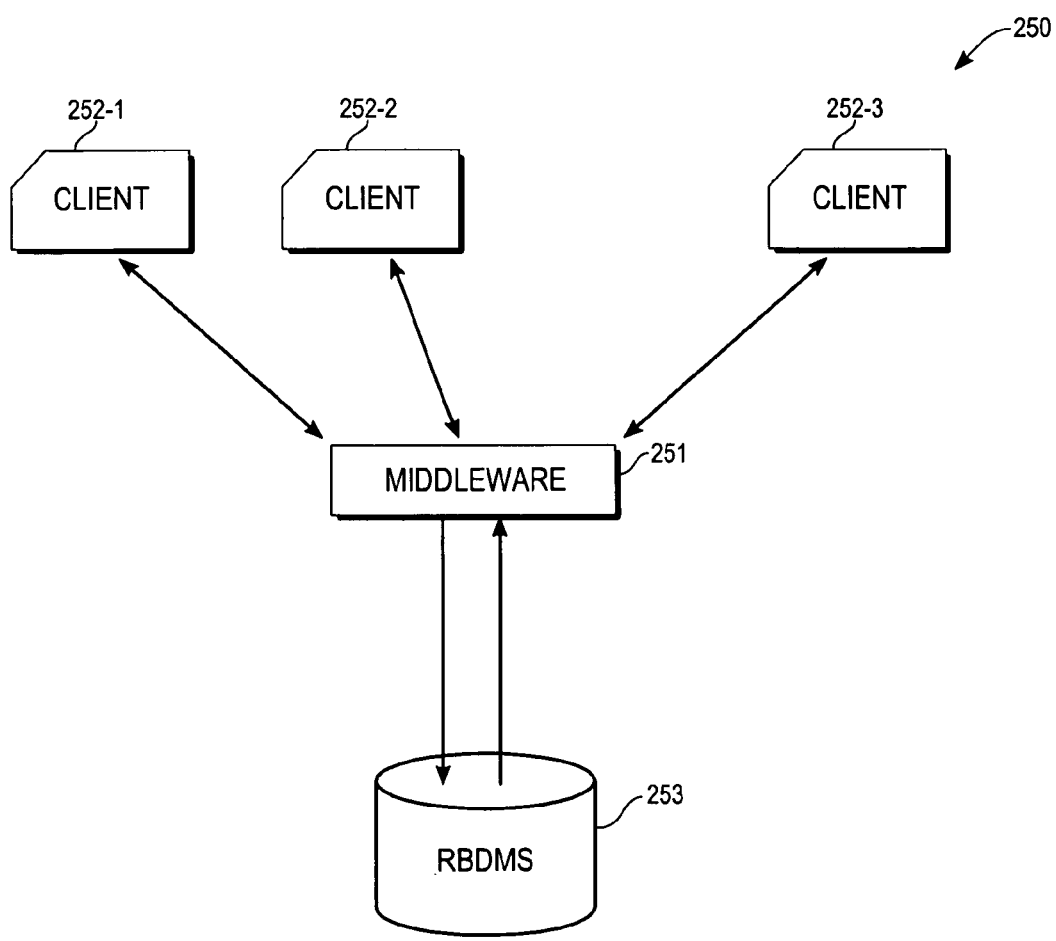
FIG. 25 schematically illustrates a conventional system for receiving, processing and analyzing project management data and for responding to queries concerning the received data.

FIG. 25 schematically illustrates a conventional system 250 for receiving, processing and analyzing project management data ("PM data") and for responding to queries concerning the received data. A middleware module 251 receives PM data from a plurality of clients 252-$i$ ($i=1, \ldots, I$), processes the PM data received, and stores the data in an RBDMS 253. The data stored in the RDBMS 263 is initially well structured, and whatever schema is initially adopted must be persistent, wherein certain parameters that define the schema do not vary with time. User information and queries are non-persistent. This limits the flexibility of the conventional system and requires imposition of certain constraints on the formatting of input information and of queries used with the system.

Figure 26:
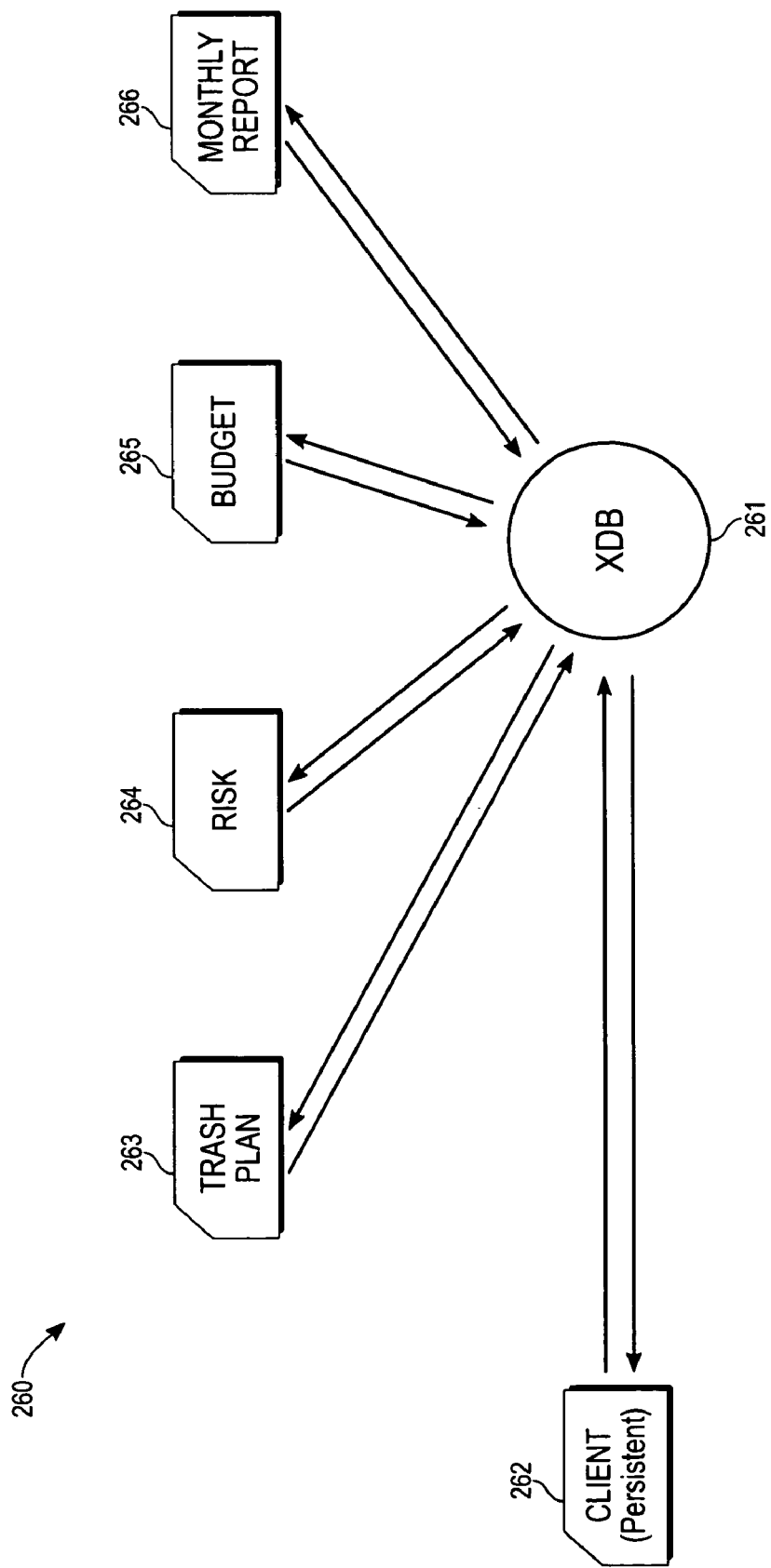
FIG. 26 schematically illustrates a system, constructed according to the invention, for receiving, processing and analyzing PM data, and for responding to queries concerning the received data, both unprocessed and processed.

FIG. 26 schematically illustrates a system 260, constructed according to the invention, for receiving, processing and analyzing PM data, and for responding to queries concerning the received data, both unprocessed and processed. The input information is received by an XDB database module 261 from a plurality of clients 262-$i$ ($i=1, \ldots, I$) that have non-persistent schema. At the XDB 261, the schema are set by the document decomposed into context/content, and are thus non-persistent: the context is defined during a post-processing phase, rather than during a pre-processing phase. The XDB module 261 uses an extension of Netmark, where context searching and content searching are provided, includes a cache for input information that is most frequently requested by system users, is heterogeneous, and works with arbitrary (time varying) schema. A user or client 262, normally having a persistent format, enters relevant data into the XDB module 262 or, alternatively, enters a query for information contained in the XDB module. The XDB module 261 enters the client-entered relevant information into a processing and storage module associated with one or more of a Task Plan component 263, a Risk Assessment component 264, a Budget component 265 and a Monthly Report component 266 or, alternatively, retrieves information from one or more of these components in order to respond to a user's query.

What is claimed is:

1. A method of managing a project that includes multiple tasks and a plurality of workers, the method comprising:

providing a computer-based database that comprises a human model component of the project, a team model component of the project and a product model component of the project, where:

the human model component comprises information, for at least one worker having responsibility for at least one specified task under the project, concerning location of at least one worker, place of the at least one worker within an organization chart, personality of the at least one worker as assessed by at least one personality test, an assessment of whether the at least one worker is an introvert or an extrovert, estimated morale of the at least one worker, estimated flexibility of the at least one worker, relevant skills of the at least one worker, relevant experience of the at least one worker, tasks presently assigned to the at least one worker, and present workload of the at least one worker;

the team model component comprises information on a ratio of project managers to operational workers, a ratio of introverts to extroverts among workers on the project, at least one specific skill set required for the at least one worker, types of operational workers required, experience as a team working together, estimated morale of the workers as a team, estimated level of autonomy, estimated team attitude toward risk, and assessment of centralization versus decentralization of team structure;

the product model component comprises information on relationship of at least one product to other products previously developed; technologies involved in the at least one product; components involved in the at least one product; an interface, if any, between the at least one product and another product; estimated life cycle of the at least one product; estimated maturity of the at least one product; characteristics of present or contemplated customers for the at least one product; estimated customization that may be required for the at least one product; and a Technology Readiness Level ("TRL") for the at least one product;

the TRL for the at least one product is estimated as a value that increases monotonically as said at least one product moves closer to use in a real environment of the at least one product's contemplated function, where a set of levels of the TRL comprises the following levels of use: (1) basic principles of a product are observed and reported; (2) concept and/or application of the product is formulated; (3) analytical and experimental critical function(s) and/or characteristics of the product are determined to be feasible; (4) component or subsystem or system of the product is validated by a breadboard, if appropriate, in a laboratory environment; (5) component or subsystem or system of the product is validated by a breadboard in a relevant environment; (6) prototype of component or subsystem or system of the product is prepared; (7) system prototype for the product is demonstrated in a relevant environment; (8) actual system including the product is qualified through tests and demonstrations; and (9) actual system including the product is successfully tested many times in a real environment; and providing a search system comprising a computer that is programmed to (i) receive a query, in at least one of a context format and a content format, involving information that may be available in at least one of the human model component, the team model component and the product model component, and (ii) identify and present the available information that responds to the query.

2. The method of claim 1, further comprising:

providing said team model component, for a first project that is completed or substantially completed, with information on at least one of: number M1 of managers for the first project, number TW1 of technical workers for the first project, number CA1 of computer application specialists and number SA1 of support/administrative workers involved in the first project; number SS1 of special skill workers required for the first project; length T1 of time interval required to initiate and substantially complete the first project, and cost $C1 to initiate and substantially complete the first project;

receiving a request to implement a second project that is similar to the first project; and evaluating the second project by assuming at least one of the following: number M2 of managers for the second project is approximately M1; number TW2 of technical workers for the second project is approximately TW1; number CA2 of computer applications specialists for the second project is approximately CA1, number SA2 of support/administrative workers for the second project is approximately SA1, number SS2 of special skill workers for the second project is approximately SS1, length T2 of time interval required to initiate and substantially complete the second project is approximately T1, and cost $C2 to initiate and substantially complete the second project is approximately equal to the cost $C1.

3. A system for managing a project that includes multiple tasks and a plurality of workers, the system comprising a computer that is programmed:

to provide a database that comprises a human model component of the project, a team model component of the project and a product model component of the project, where:

the human model component comprises information, for at least one worker having responsibility for at least one specified task under the project, concerning location of at least one worker, place of the at least one worker within an organization chart, personality of the at least one worker as assessed by at least one personality test, an assessment of whether the at least one worker is an introvert or an extrovert, estimated morale of the at least one worker, estimated flexibility of the at least one worker, relevant skills of the at least one worker, relevant experience of the at least one worker, tasks presently assigned to the at least one worker, and present workload of the at least one worker;

the team model component comprises information on a ratio of project managers to operational workers, a ratio of introverts to extroverts among workers on the project at least one specific skill set required for the at least one worker, types of operational workers required, experience as a team working together, estimated morale of the workers as a team, estimated level of autonomy, estimated team attitude toward risk, and assessment of centralization versus decentralization of team structure; and the product model component comprises information on relationship of at least one product to other products previously developed; technologies involved in the at least one product; components involved in the at least one product; an interface, if any, between the at least one product and another product; estimated life cycle of the at least one product; estimated maturity of the at least one product; characteristics of present or contemplated customers for the at least one product; estimated customization that may be required for the at least one product; and a Technology Readiness Level ("TRL") for the at least one product;

wherein the computer is further programmed to estimate a level for the TRL for the at least one product as a value that increases monotonically as the at least one product moves closer to use in a real environment for the at least one product's contemplated function, where a subset or full set of levels of the TRL corresponds to the following levels of use: (1) basic principles of a product are observed and reported; (2) concept and/or application of the product is formulated; (3) analytical and experimental critical function(s) and/or characteristics of the product are determined to be feasible; (4) component or subsystem or system of the product is validated by a breadboard, if appropriate, in a laboratory environment; (5) component or subsystem or system of the product is validated by a breadboard in a relevant environment; (6) prototype of component or subsystem or system of the product is prepared; (7) system prototype for the product is demonstrated in a relevant environment; (8) actual system including the product is qualified through tests and demonstrations; and (9) actual system including the product is successfully tested many times in a real environment; and the computer further comprises a search system that receives a query, in at least one of a context format and a content format, involving information that may be available in at least one of the human model component, the team model component and the product model component, and identifies and presents the available information that responds to the query.

4. The system of claim 3, wherein said computer is further programmed:

to provide said team model component, for a first project that is completed or substantially completed, with information on at least one of: number M1 of managers for the first project, number TW1 of technical workers for the first project, number CA1 of computer application specialists and number SA1 of support/administrative workers involved in the first project; number SS1 of special skill workers required for the first project; length T1 of time interval required to initiate and substantially complete the first project; and cost $C1 to initiate and substantially complete the first project;

in response to receiving a request to implement a second project that is similar to the first project, to evaluate the second project by assuming at least one of the following: number M2 of managers for the second project is approximately M1; number TW2 of technical workers for the second project is approximately TW1; number CA2 of computer applications specialists for the second project is approximately CA1, number SA2 of support/administrative workers for the second project is approximately SA1, number SS2 of special skill workers for the second project is approximately SS1, length T2 of time interval required to substantially complete the second project is approximately T1, and cost $C2 to initiate and substantially complete the second project is approximately equal to the cost $C1.

* * * * *

UNITED STATES PATENT AND TRADEMARK OFFICE
CERTIFICATE OF CORRECTION

PATENT NO. : 7,596,416 B1  Page 1 of 1
APPLICATION NO. : 10/928874
DATED : September 29, 2009
INVENTOR(S) : Maluf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1061 days.

Signed and Sealed this

Twenty-eighth Day of September, 2010

David J. Kappos
*Director of the United States Patent and Trademark Office*